(12) United States Patent
Hayashi et al.

(10) Patent No.: US 10,851,842 B2
(45) Date of Patent: Dec. 1, 2020

(54) POWER TRANSMISSION DEVICE

(71) Applicant: DENSO CORPORATION, Kariya (JP)

(72) Inventors: Toshihiro Hayashi, Kariya (JP); Hiroki Nagahashi, Kariya (JP); Kiyoshi Kurohata, Kariya (JP); Toshihiro Konishi, Kariya (JP); Shigeyoshi Sakuraba, Kariya (JP); Takayuki Hirose, Kariya (JP)

(73) Assignee: DENSO CORPORATION, Kariya (JP)

( * ) Notice: Subject to any disclaimer, the term of this patent is extended or adjusted under 35 U.S.C. 154(b) by 62 days.

(21) Appl. No.: 16/295,324

(22) Filed: Mar. 7, 2019

(65) Prior Publication Data

US 2019/0203776 A1    Jul. 4, 2019

Related U.S. Application Data

(63) Continuation of application No. PCT/JP2017/038818, filed on Oct. 26, 2017.

(30) Foreign Application Priority Data

Nov. 10, 2016 (JP) ................. 2016-219746
Oct. 5, 2017 (JP) ................. 2017-194962

(51) Int. Cl.
  *F16D 3/68* (2006.01)
  *F16H 55/36* (2006.01)
  *F16D 27/112* (2006.01)
(52) U.S. Cl.
  CPC ............. *F16D 3/68* (2013.01); *F16D 27/112* (2013.01); *F16H 55/36* (2013.01); *F16H 2055/366* (2013.01)

(58) Field of Classification Search
  CPC .......... F16D 3/68; F16D 27/112; F16H 55/36; F16H 2055/366
  See application file for complete search history.

(56) References Cited

U.S. PATENT DOCUMENTS

| | | | |
|---|---|---|---|
| 4,493,407 | A | 1/1985 | Newton |
| 2006/0084541 | A1 | 4/2006 | Nosaka et al. |
| 2009/0258741 | A1 | 10/2009 | Nosaka et al. |

FOREIGN PATENT DOCUMENTS

| | | |
|---|---|---|
| JP | S62-233529 A | 10/1987 |
| JP | H05-4579 Y2 | 2/1993 |
| JP | H05-4580 Y2 | 2/1993 |
| JP | H05-4581 Y2 | 2/1993 |

(Continued)

*Primary Examiner* — Huan Le
(74) *Attorney, Agent, or Firm* — Posz Law Group, PLC

(57) ABSTRACT

A power transmission device includes an electromagnet, a rotor, an armature and a hub that couples the armature to a shaft of a driving target device. The hub includes an outer hub coupled to the armature, an inner hub coupled to the shaft, and an elastic member interposed between the outer hub and the inner hub. An outer peripheral side of the inner hub includes plural extending parts each extending outward in a radial direction. An inner peripheral side of the outer hub includes an inner peripheral side wall that overlaps with the extending parts in a rotational direction and surrounds the extending parts. The elastic member is disposed in an unbonded state with respect to at least one of the inner hub and the outer hub between the outer peripheral side of the inner hub and the inner peripheral side of the outer hub.

13 Claims, 17 Drawing Sheets

(56) References Cited

FOREIGN PATENT DOCUMENTS

| JP | H06-074258 | A | 3/1994 | |
| JP | h06074258 | * | 3/1994 | ............ F16D 27/112 |
| JP | 2554076 | B2 | 8/1996 | |

* cited by examiner

POWER TRANSMISSION DEVICE

CROSS REFERENCE TO RELATED APPLICATION

The present application is a continuation application of International Patent Application No. PCT/JP2017/038818 filed on Oct. 26, 2017, which designated the U.S. and claims the benefit of priority from Japanese Patent Application No. 2016-219746 filed on Nov. 10, 2016 and Japanese Patent Application No. 2017-194962 filed on Oct. 5, 2017. The entire disclosures of all of the above applications are incorporated herein by reference.

TECHNICAL FIELD

The present disclosure relates to a power transmission device that transmits a rotary driving force output from a driving source to a driving target device.

BACKGROUND ART

There has been conventionally known an electromagnetic clutch in which the inner peripheral face of a holding plate which is coupled to an armature is formed in a noncircular shape, the outer peripheral face of a hub which is coupled to a shaft is formed in a noncircular shape, and an elastic member is interposed between the holding plate and the hub. The elastic member is bonded to the inner peripheral face of the holding plate and the outer peripheral face of the hub with an adhesive.

SUMMARY

According to an aspect of the present disclosure, a power transmission device includes: an electromagnet that generates an electromagnetic attraction force by energization; a rotor that rotates by the rotary driving force; an armature that is coupled to the rotor to rotate integrally with the rotor when the electromagnet is energized and detached from the rotor when the electromagnet is not energized; and a hub that couples the armature to a shaft of a driving target device. The hub includes an outer hub coupled to the armature, an inner hub coupled to the shaft, and an elastic member interposed between the outer hub and the inner hub. An outer peripheral side of the inner hub includes a plurality of extending parts each extending outward in a radial direction of the shaft. An inner peripheral side of the outer hub includes an inner peripheral side wall that overlaps with the extending parts in a rotation direction of the shaft and surrounds the extending parts. The elastic member is disposed between the outer peripheral side of the inner hub and the inner peripheral side of the outer hub in an unbonded state with respect to at least one of the inner hub and the outer hub.

DESCRIPTION OF EMBODIMENTS

Figure 1:
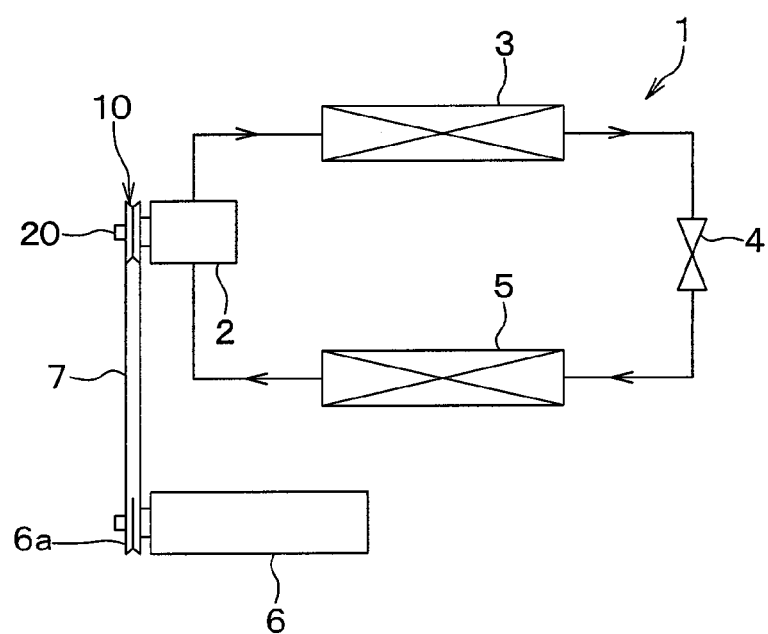
FIG. 1 is a configuration diagram of a refrigeration cycle to which a power transmission device of a first embodiment is applied.

To begin with, examples of relevant techniques will be described.

In recent years, reduction of the number of cylinders of an engine as a driving source and downsizing of an engine by supercharging have been performed in order to improve fuel saving in a vehicle. Thus, torque fluctuations on the engine side tend to increase. Along with this, improvement of the durability against torque fluctuations on the engine side is required of auxiliaries around the engine.

Thus, the inventors have conducted earnest studies to improve the durability of a power transmission device. It has been found, from the studies by the inventors, that the configuration in which the elastic member is bonded to the inner peripheral face of the holding plate and the outer peripheral face of the hub lacks durability because not only a compressive load, but also a tensile load acts on the elastic member.

The present disclosure provides a power transmission device capable of improving the strength against a load repeatedly acting on an elastic member along with transmission of a rotary driving force from a driving source.

According to an aspect of the present disclosure, a power transmission device that transmits a rotary driving force output from a driving source to a driving target device includes: an electromagnet that generates an electromagnetic attraction force by energization; a rotor that rotates by the rotary driving force; an armature that is coupled to the rotor to rotate integrally with the rotor when the electromagnet is energized and detached from the rotor when the electromagnet is not energized; and a hub that couples the armature to a shaft of a driving target device.

The hub includes an outer hub coupled to the armature, an inner hub coupled to the shaft, and an elastic member interposed between the outer hub and the inner hub. An outer peripheral side of the inner hub includes a plurality of extending parts each extending outward in a radial direction of the shaft. An inner peripheral side of the outer hub includes an inner peripheral side wall that overlaps with the extending parts in a rotation direction of the shaft and surrounds the extending parts. The elastic member is disposed between the outer peripheral side of the inner hub and the inner peripheral side of the outer hub in an unbonded state with respect to at least one of the inner hub and the outer hub.

Accordingly, when the rotary driving force from the driving source is transmitted to the armature through the rotor, a compressive load acts on the elastic member at the outer peripheral side of the inner hub located on the forward side in the rotation direction and at the inner peripheral side of the outer hub located on the rearward side in the rotation direction.

On the other hand, even when the rotary driving force from the driving source is transmitted to the armature through the rotor, no tensile load acts on the elastic member at the inner peripheral side of the outer hub located on the forward side in the rotation direction and at the outer peripheral side of the inner hub located on the rearward side in the rotation direction.

In this manner, the power transmission device of the present disclosure has a configuration in which a compressive load acts on the elastic member, but no tensile load acts on the elastic member. Thus, it is possible to improve the strength against the load repeatedly acting on the elastic member along with the transmission of the rotary driving force from the driving source. As a result, fatigue breakdown of the elastic member of the power transmission device is prevented. Thus, it is possible to improve the durability of the power transmission device.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

An embodiment is described with reference to FIGS. 1 to 14. In the present embodiment, a power transmission device 10 is applied to a compressor 2 of a vapor compression refrigeration cycle 1 shown in FIG. 1.

The refrigeration cycle 1 functions as an apparatus that controls the temperature of air blown into a cabin in a vehicle air conditioner which performs air conditioning inside the cabin. The refrigeration cycle 1 includes a closed circuit in which a compressor 2 which compresses and discharges a refrigerant, a radiator 3 which radiates heat from the refrigerant discharged from the compressor 2, an expansion valve 4 which decompresses the refrigerant flowing out of the radiator 3, and an evaporator 5 which evaporates the refrigerant decompressed by the expansion valve 4 are annularly connected.

A rotary driving force output from an engine 6 is transmitted to the compressor 2 through the power transmission device 10. In the present embodiment, the engine 6 constitutes a driving source which outputs the rotary driving force, and the compressor 2 constitutes a driving target device.

For example, a swash plate variable displacement compressor can be employed as the compressor 2. The compressor 2 may be any compressor that compresses and discharges the refrigerant of the refrigeration cycle 1 by the rotary driving force transmitted thereto, such as a variable displacement compressor of another form or a fixed displacement compressor such as a scroll type fixed displacement compressor or a vane type fixed displacement compressor.

The compressor 2 of the present embodiment includes a shaft 20, and one end side of the shaft 20 is exposed to the outside of a housing (not illustrated). The power transmission device 10 is attached to the part exposed to the outside in the shaft 20. A seal member such as a lip seal is interposed between the shaft 20 and the housing (not illustrated) which constitutes a shell of the compressor 2 so as to prevent a refrigerant inside the housing from leaking through a gap between the shaft 20 and the housing. The material and the shape of the seal member are optimized so that high sealability can be obtained between the shaft 20 and the housing.

The power transmission device 10 intermittently transmits the rotary driving force output from the engine 6 as the driving source for vehicle traveling to the compressor 2 as the driving target device. The power transmission device 10 is connected to a rotation output unit 6a of the engine 6 through a V belt 7.

Figure 2:
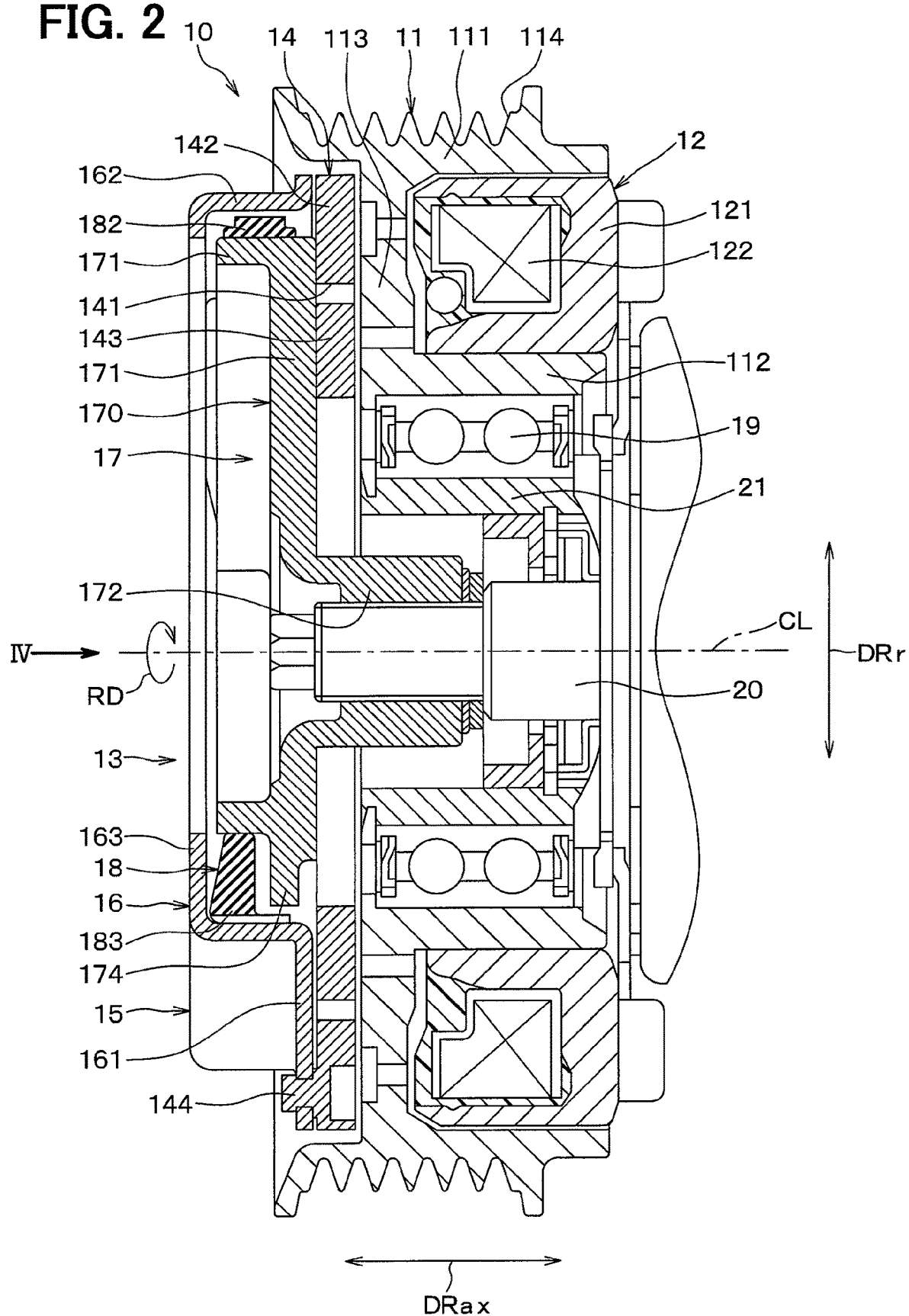
FIG. 2 is a schematic sectional view illustrating a configuration of the power transmission device of the first embodiment.

FIG. 2 is sectional view of the power transmission device 10 taken along the axial direction of the shaft 20 of the compressor 2. DRax in FIG. 2 indicates the axial direction of the shaft 20, the axial direction extending along an axis CL of the shaft 20. Further, DRr in FIG. 2 indicates the radial direction of the shaft 20, the radial direction being perpendicular to the axial direction DRax. The same applies to the drawings other than FIG. 2.

Figure 3:
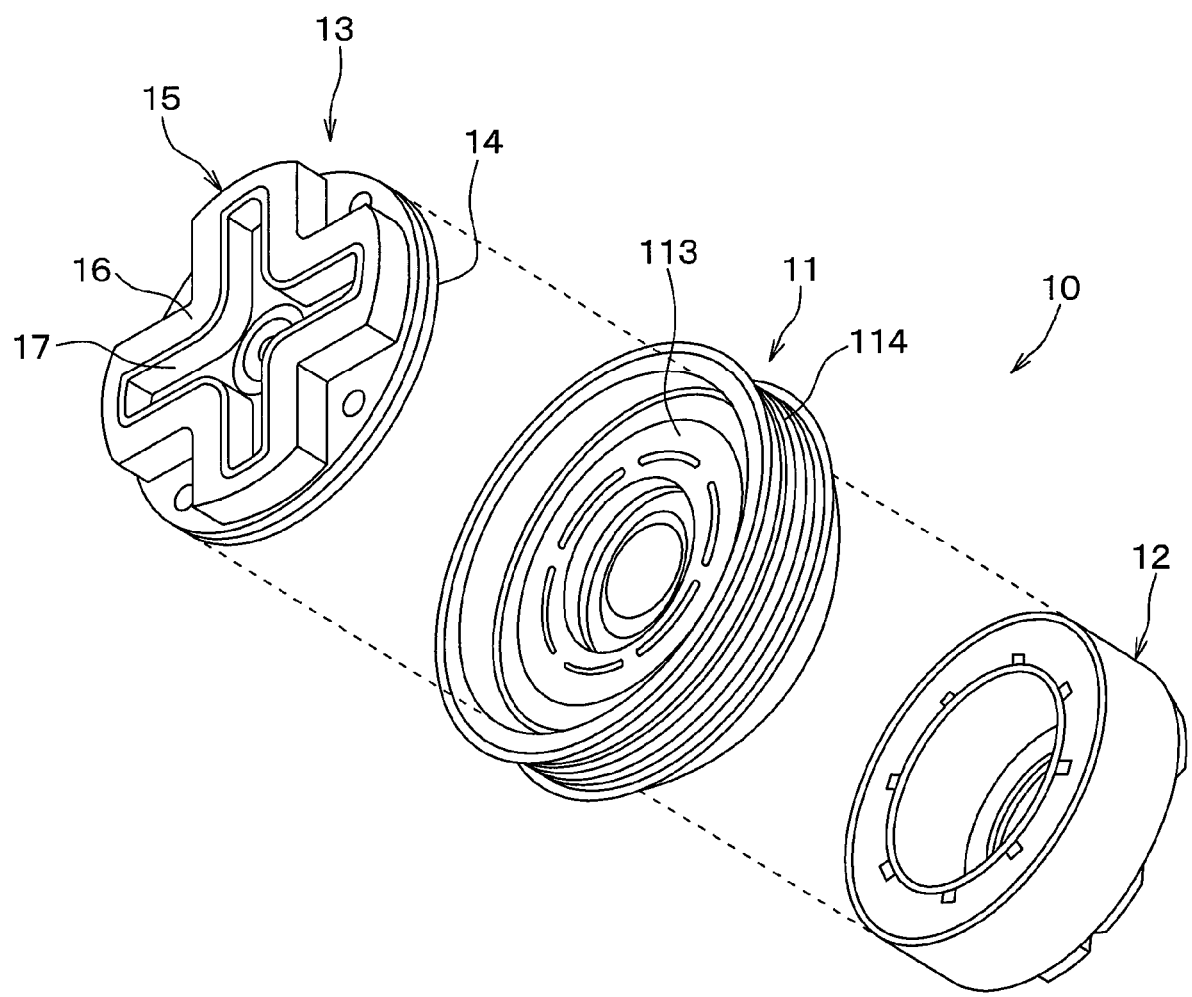
FIG. 3 is a schematic exploded perspective view of the power transmission device of the first embodiment.

As illustrated in FIGS. 2 and 3, the power transmission device 10 includes a rotor 11, a driven side rotary body 13 which is coupled to the rotor 11 to rotate together with the shaft 20 of the compressor 2, and an electromagnet 12 which generates an electromagnetic attraction force which couples the driven side rotary body 13 and the rotor 11 together.

The rotor 11 constitutes a driving side rotary body which rotates by the rotary driving force output from the engine 6. As illustrated in FIG. 2, the rotor 11 of the present embodiment includes an outer cylindrical part 111, an inner cylindrical part 112, and an end face part 113.

The outer cylindrical part 111 is formed in a cylindrical shape and disposed coaxially with the shaft 20. The inner cylindrical part 112 is formed in a cylindrical shape. The inner cylindrical part 112 is disposed on the inner peripheral side of the outer cylindrical part 111 and disposed coaxially with the shaft 20.

The end face part 113 is a coupling part which couples one end side of the outer cylindrical part 111 in the axial direction DRax to one end side of the inner cylindrical part 112 in the axial direction DRax. The end face part 113 is formed in a discoid shape. That is, the end face part 113 expands in the radial direction DRr of the shaft 20 and includes a through hole having a circular shape on the center thereof. The through hole penetrates the end face part 113 from the front to the back.

A section of the rotor 11 of the present embodiment in the axial direction DRax of the shaft 20 has a C shape. A space having an annular shape is formed between the outer cylindrical part 111 and the inner cylindrical part 112. The end face part 113 constitutes the bottom face of the space.

The space formed between the outer cylindrical part 111 and the inner cylindrical part 112 is coaxial with the shaft 20. The electromagnet 12 is disposed in the space formed between the outer cylindrical part 111 and the inner cylindrical part 112.

The electromagnet 12 includes a stator 121 and a coil 122 which is disposed inside the stator 121. The stator 121 is made of a ferromagnetic material such as iron and formed in an annular shape. The coil 122 is molded with an insulating resin material such as epoxy resin and fixed to the stator 121. Energization of the electromagnet 12 is performed by a control voltage output from a control device (not illustrated).

The outer cylindrical part 111, the inner cylindrical part 112, and the end face part 113 are integrally formed of a ferromagnetic material such as iron. The outer cylindrical part 111, the inner cylindrical part 112, and the end face part 113 constitute a part of a magnetic circuit which is generated by energizing the electromagnet 12.

A V groove part 114 made of resin is formed on the outer peripheral side of the outer cylindrical part 111. The V groove part 114 includes a plurality of V-shaped grooves. The V belt 7 which transmits the rotary driving force output from the engine 6 is stretched over the V groove part 114.

The outer peripheral side of a ball bearing 19 is fixed to the inner peripheral side of the inner cylindrical part 112. A boss 21 having a cylindrical shape is fixed to the inner peripheral side of the ball bearing 19. The boss 21 projects toward the power transmission device 10 from the housing which constitutes the shell of the compressor 2. Accordingly, the rotor 11 is rotatably fixed to the housing of the compressor 2. The boss 21 covers a base part of the shaft 20, the base part being exposed to the outside of the housing.

An outer side face of the end face part 113 on one end side in the axial direction DRax forms a frictional surface which comes into contact with an armature 14 of the driven side rotary body 13 (described below) when the rotor 11 and the armature 14 are coupled together.

In the present embodiment, although not illustrated, a frictional member for increasing the coefficient of friction of the end face part 113 is disposed on a part of the surface of the end face part 113. The frictional member is made of a nonmagnetic material. Alumina solidified with resin or a sintered body of metal powder such as aluminum can be employed as the frictional member.

The driven side rotary body 13 includes the armature 14 and a hub 15. The armature 14 is an annular plate member which expands in the radial direction DRr and includes a through hole on the center thereof. The through hole penetrates the armature 14 from the front to the back. The armature 14 is made of a ferromagnetic material such as iron. The armature 14 constitutes the part of the magnetic circuit, which is generated when the electromagnet 12 is energized, together with the rotor 11.

The armature 14 faces the end face part 113 of the rotor 11 with a predetermined tiny clearance (e.g., approximately 0.5 mm) therebetween. A flat part of the armature 14, the flat part facing the end face part 113 of the rotor 11, forms a frictional surface which comes into contact with the end face part 113 when the rotor 11 and the armature 14 are coupled together.

The armature 14 of the present embodiment includes a groove 141 for magnetism block. The groove 141 is formed in an intermediate part of the armature 14 in the radial direction DRr. The groove 141 has an arc shape extending in the circumferential direction of the armature 14. A plurality of grooves 141 are formed on the armature 14. The armature 14 of the present embodiment is divided into an outer peripheral part 142 which is located on the outer peripheral side of the groove 141 and an inner peripheral part 143 which is located on the inner peripheral side of the groove 141. The outer peripheral part 142 of the armature 14 is connected to the hub 15 with a fastening member 144 such as a rivet.

The hub 15 constitutes a coupling member which couples the armature 14 to the shaft 20 of the compressor 2. In other words, the armature 14 and the shaft 20 are coupled together through the hub 15.

Figure 4:
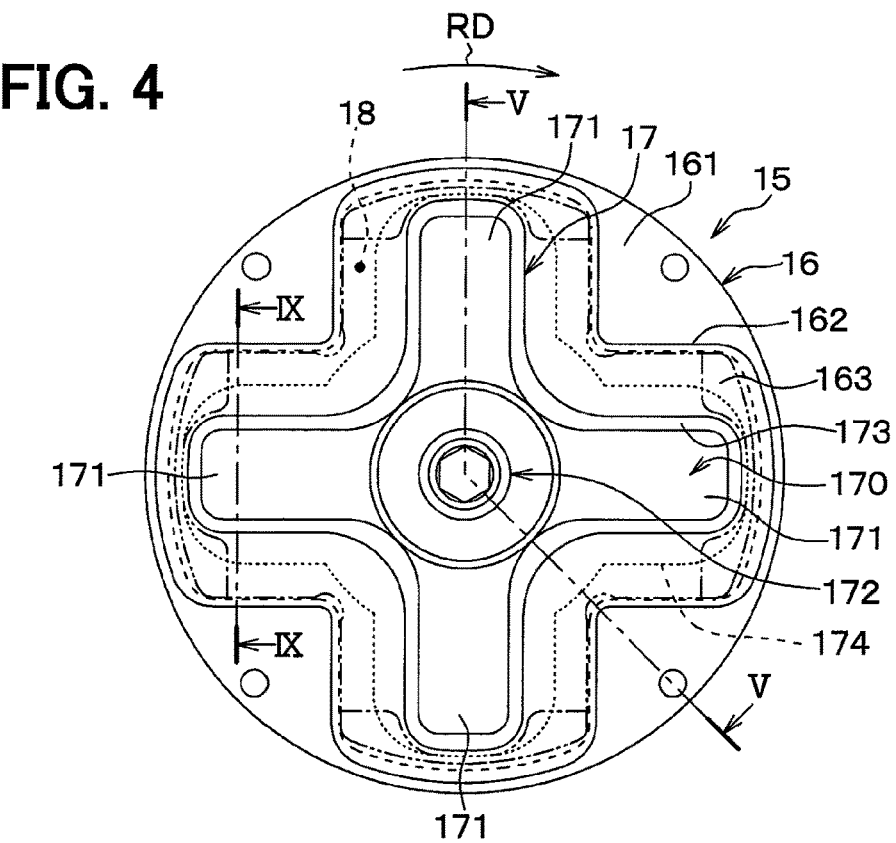
FIG. 4 is a view illustrating a hub of the power transmission device seen in an arrow direction IV of FIG. 2.
Figure 5:
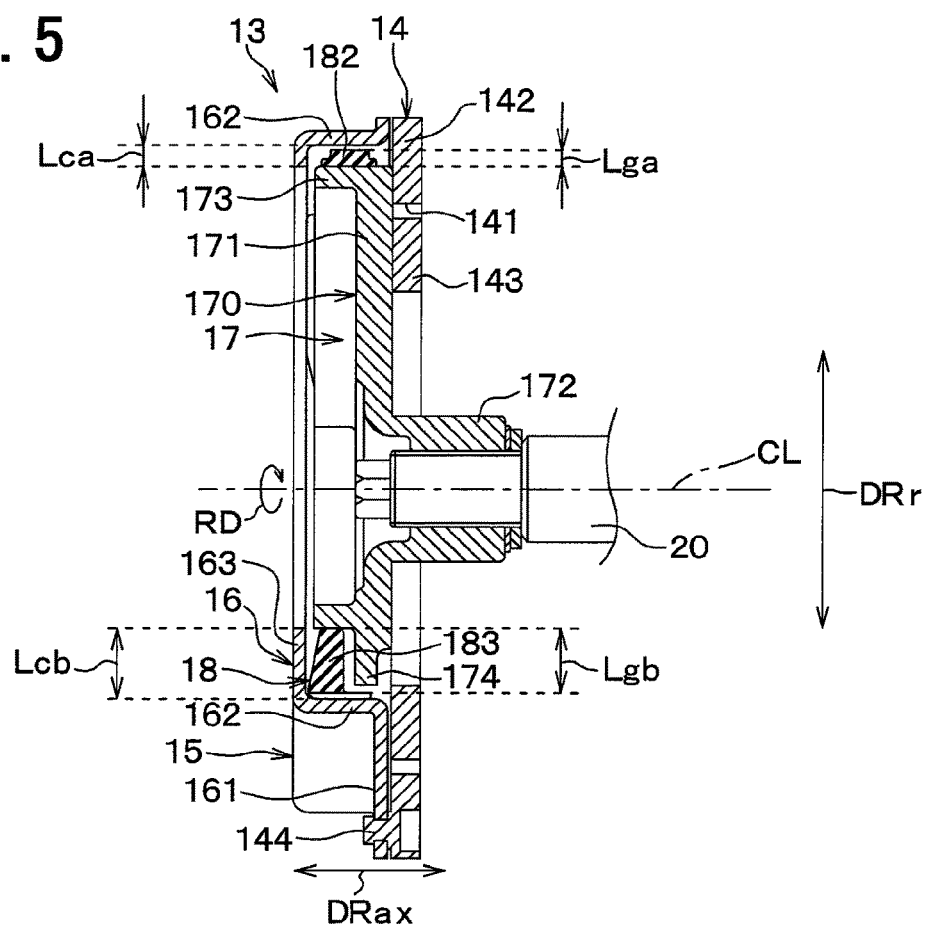
FIG. 5 is a sectional view taken along line V-V of FIG. 4.

As illustrated in FIGS. 4 and 5, the hub 15 of the present embodiment includes an outer hub 16, an inner hub 17, and an elastic member 18. A chain double-dashed line in FIG. 4 indicates the outer peripheral edge of the elastic member 18.

Figure 6:
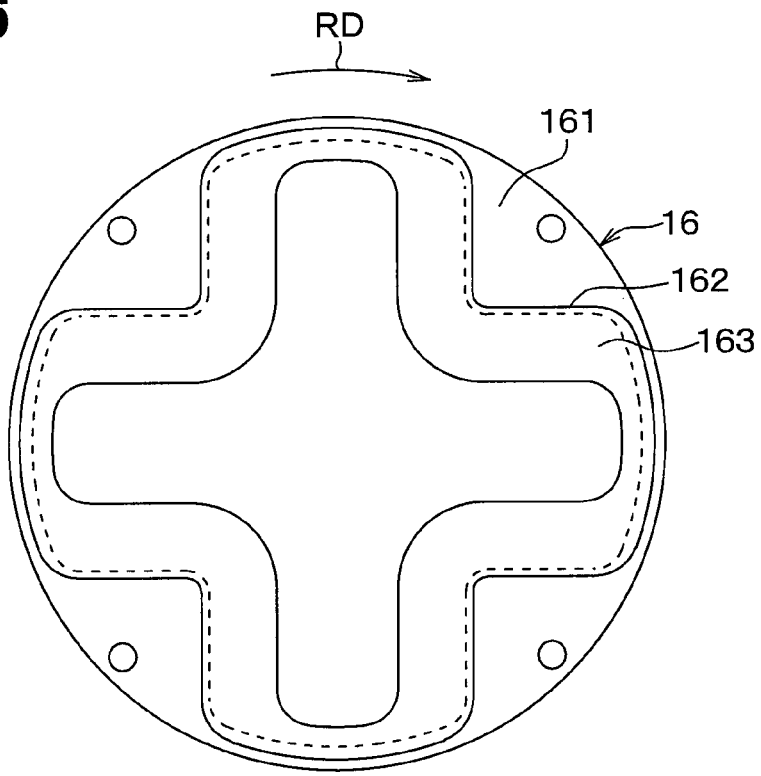
FIG. 6 is a schematic front view of an outer hub.

The outer hub 16 is coupled to the outer peripheral part 142 of the armature 14 with the fastening member 144. As illustrated in FIGS. 5 and 6, the outer hub 16 includes an outer side coupling part 161 which is coupled to the armature 14 and has a plate-like shape, an outer side flange part 162 which extends in the axial direction DRax of the shaft 20 from the inner peripheral side of the outer side coupling part 161, and an outer side receiving part 163. In the outer hub 16 of the present embodiment, the outer side coupling part 161, the outer side flange part 162, and the outer side receiving part 163 are configured as an integrally molded product.

The outer peripheral side of the outer side coupling part 161 has a shape corresponding to the outer shape of the armature 14. The outer side coupling part 161 includes an opening having a cross shape (that is, an X shape) inside a part coupled to the armature 14.

The outer side flange part 162 extends in a direction away from the armature 14 from the inner peripheral side of the outer side coupling part 161. The outer side flange part 162 has a shape that overlaps with an extending part 171 of the inner hub 17 (described below) in a rotation direction RD of the shaft 20 and surrounds the extending part 171.

Specifically, the outer side flange part 162 includes a tubular part having a cross shape (that is, an X shape) corresponding to the outer shape of the inner hub 17. A predetermined clearance is formed between the inner peripheral side of the outer side flange part 162 and the outer peripheral side of the inner hub 17 so that the elastic member 18 can be interposed therebetween. In the present embodiment, the outer side flange part 162 constitutes an inner peripheral side wall that overlaps with the extending part 171 of the inner hub 17 (described below) in the rotation direction RD of the shaft 20 and surrounds the extending part 171.

The outer side receiving part 163 is provided for preventing the elastic member 18 from moving in the axial direction DRax of the shaft 20. The outer side receiving part 163 faces a part of the elastic member 18 on the side opposite to the armature 14 in the axial direction DRax of the shaft 20 and extends from the outer side flange part 162 toward the axis CL of the shaft 20. An opening having a cross shape is formed inside the outer side receiving part 163.

Figure 7:
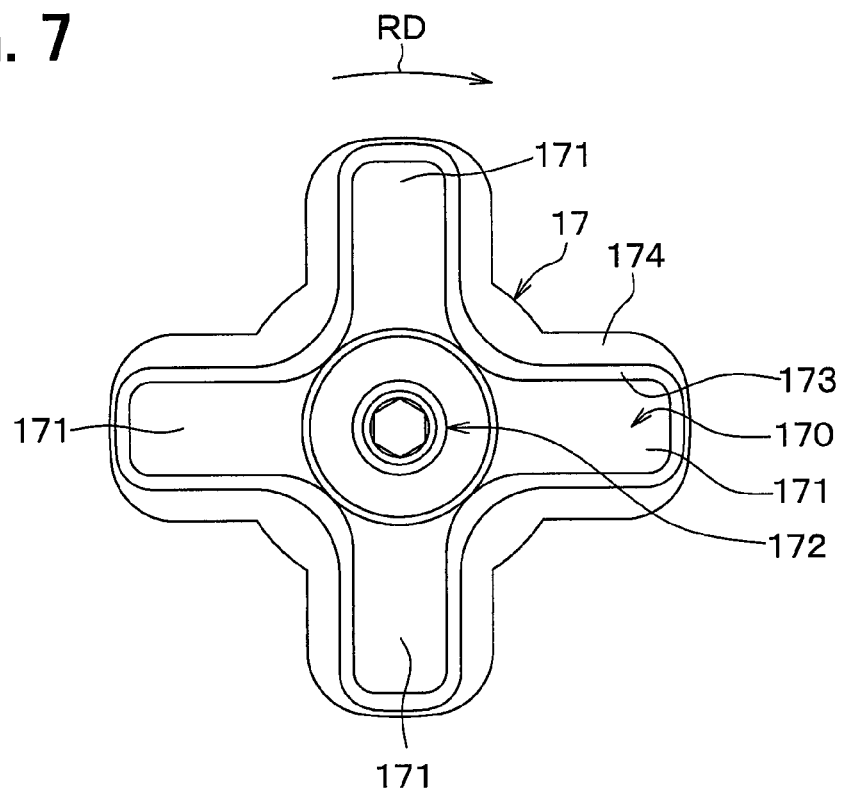
FIG. 7 is a schematic front view of an inner hub.

As illustrated in FIG. 5, the inner hub 17 is coupled to the shaft 20 of the compressor 2. As illustrated in FIGS. 5 and 7, the inner hub 17 includes an inner side plate-like part 170, a boss part 172 which is coupled to the shaft 20, an inner side flange part 173 which extends in the axial direction DRax of the shaft 20 from the outer peripheral side of the inner side plate-like part 170, and an inner side receiving part 174. In the inner hub 17 of the present embodiment, the inner side plate-like part 170, the boss part 172, the inner side flange part 173, and the inner side receiving part 174 are configured as an integrally molded product.

The inner side plate-like part 170 expands in the radial direction DRr of the shaft 20. A part of the inner side plate-like part 170, the part facing the armature 14, abuts on the armature 14. The inner side plate-like part 170 is provided with four extending parts 171 on the outer peripheral side thereof. The four extending parts 171 extend outward in the radial direction DRr of the shaft 20. The four extending parts 171 are disposed on the inner side plate-like part 170 at regular intervals in the rotation direction RD of the shaft 20. Accordingly, the outer shape of the inner hub 17 is a cross shape (that is, an X shape).

The boss part 172 is disposed on the central part of the inner side plate-like part 170. The boss part 172 includes a tubular part projecting toward the compressor 2. A female thread which is screwed with a male thread formed on the outer peripheral side of the shaft 20 is formed on the inner peripheral side of the boss part 172. The inner hub 17 is coupled to the shaft 20 by screwing the female thread formed on the boss part 172 with the male thread formed on the shaft 20.

The inner side flange part 173 extends in a direction away from the armature 14 from the outer peripheral side of the inner side plate-like part 170. The inner side flange part 173 faces the outer side flange part 162 and extends in the axial direction DRax of the shaft 20.

Specifically, the inner side flange part 173 includes a tubular part having a cross shape (that is, an X shape). A predetermined clearance is formed between the outer peripheral side of the inner side flange part 173 and the inner peripheral side of the outer hub 16 so that the elastic member 18 can be interposed therebetween.

The inner side receiving part 174 is provided for preventing the elastic member 18 from moving in the axial direction DRax of the shaft 20. The inner side receiving part 174 faces a part of the elastic member 18 on the armature 14 side in the axial direction DRax of the shaft 20 and extends outward in the radial direction DRr of the shaft 20 from the inner side plate-like part 170.

The elastic member 18 holds the outer hub 16 movably in the axial direction DRax of the shaft 20 relative to the inner hub 17 by its elastic force and transmits torque of the outer hub 16 to the inner hub 17 in a buffering manner.

A biasing force acts on the armature 14 in a direction away from the rotor 11 by the elastic member 18. When the electromagnet 12 is in a non-energized state and no electromagnetic attraction force is generated, a clearance is generated between the flat part of the armature 14 and the end face part 113 of the rotor 11 by the biasing force of the elastic member 18.

Figure 8:
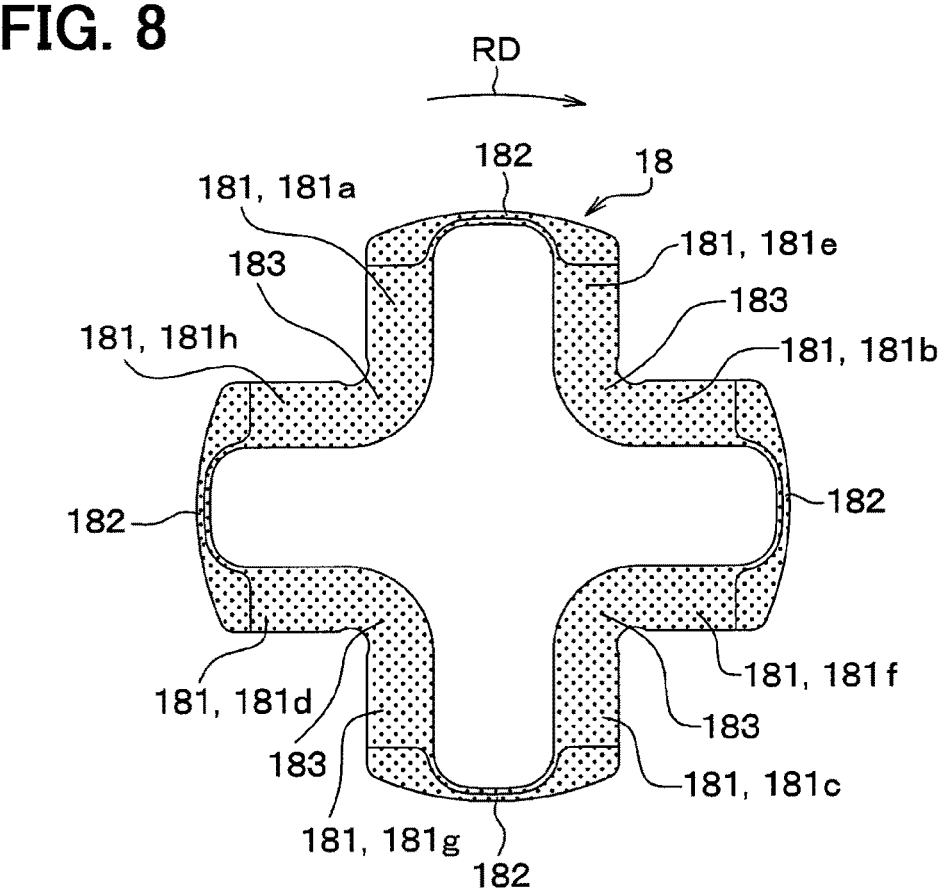
FIG. 8 is a schematic front view of an elastic member.

As illustrated in FIG. 5, the elastic member 18 is disposed between the outer side flange part 162 of the outer hub 16 and the inner side flange part 173 of the inner hub 17. As illustrated in FIGS. 5 and 8, the elastic member 18 of the present embodiment has a shape corresponding to the shape of a clearance formed between the inner peripheral side of the outer side flange part 162 and the outer peripheral side of the inner side flange part 173. In FIG. 8, for easy discrimination, the elastic member 18 is hatched with dots. The same applies to FIGS. 13, 14, 15, 16, 20, 23, and 25 described below.

The elastic member 18 of the present embodiment is disposed in an unbonded state with respect to both the outer hub 16 and the inner hub 17 between the inner peripheral side of the outer side flange part 162 and the outer peripheral side of the inner side flange part 173. That is, the elastic member 18 of the present embodiment is not bonded to both the inner peripheral side of the outer hub 16 and the outer peripheral side of the inner hub 17 with an adhesive.

The elastic member 18 of the present embodiment is disposed in a compressed state in the rotation direction RD of the shaft 20 between the inner peripheral side of the outer hub 16 and the outer peripheral side of the inner hub 17. That is, the elastic member 18 of the present embodiment is press-fitted between the inner peripheral side of the outer hub 16 and the outer peripheral side of the inner hub 17 so that a compressive load acts in the rotation direction RD of the shaft 20 between the inner peripheral side of the outer hub 16 and the outer peripheral side of the inner hub 17.

A part of the elastic member 18, in the present embodiment, in an unbonded state with respect to the inner hub 17 and the outer hub 16 is apt to wear out by friction. The wear becomes a factor in shortening the life of the elastic member 18, and is thus not preferred.

Thus, in the present embodiment, the elastic member 18 is made of any of EPDM (that is, ethylene-propylene-diene rubber), NBR (that is, nitrile rubber), and H-NBR (that is, hydrogenated nitrile rubber) which are rubber materials having high wear resistance. That is, the elastic member 18 of the present embodiment is made of any of EPDM, NBR, and H-NBR which are rubber materials having higher wear resistance than CI-IIR (that is, chlorinated butyl rubber) having high compatibility with an adhesive (that is, chemical resistance).

The elastic member 18 has an overlapping interposed part 181 which is interposed in an overlapping part where the outer hub 16 and the inner hub 17 overlap with each other in the rotation direction RD of the shaft 20. Specifically, the overlapping interposed part 181 of the elastic member 18 is disposed at a first facing part where the inner peripheral face of the outer side flange part 162 and the outer peripheral face of the inner side flange part 173 face each other in the rotation direction RD of the shaft 20. In facing parts where the inner peripheral face of the outer side flange part 162 and the outer peripheral face of the inner side flange part 173 face each other, the inner peripheral face of the outer side flange part 162 and the outer peripheral face of the inner side flange part 173 face each other in the rotation direction RD of the shaft 20 in the first facing parts. The elastic member 18 of the present embodiment includes eight overlapping interposed parts 181.

The overlapping interposed part 181 of the elastic member 18 is press-fitted between the inner peripheral side of the outer hub 16 and the outer peripheral side of the inner hub 17. Specifically, before the overlapping interposed part 181 is interposed between the inner peripheral side of the outer hub 16 and the outer peripheral side of the inner hub 17, the dimension of the overlapping interposed part 181 in a direction perpendicular to the radial direction DRr of the shaft 20 is larger than the clearance dimension between the inner peripheral side of the outer hub 16 and the outer peripheral side of the inner hub 17.

The dimension of the elastic member 18 of the present embodiment in the direction perpendicular to the radial direction DRr of the shaft 20 is set so that a compression allowance in the overlapping interposed part 181 falls within a predetermined range (e.g., approximately 4% to 15%).

The elastic member 18 further includes non-overlapping interposed parts 182, 183 each of which is interposed in a non-overlapping part where the outer hub 16 and the inner hub 17 do not overlap with each other in the rotation direction RD of the shaft 20. Specifically, each of the non-overlapping interposed parts 182, 183 is a part of the elastic member 18 disposed at a second facing part where the inner peripheral face of the outer side flange part 162 and the outer peripheral face of the inner side flange part 173 do not face each other in the rotation direction RD of the shaft 20. In the facing parts where the inner peripheral face of the outer side flange part 162 and the outer peripheral face of the inner side flange part 173 face each other, the inner peripheral face of the outer side flange part 162 and the outer peripheral face of the inner side flange part 173 do not face each other in the rotation direction RD of the shaft 20 in the second facing parts. In the present embodiment, the non-overlapping interposed part 182 is close to the tip side of the extending part 171 of the inner hub 17, and the non-overlapping interposed part 183 is close to the base side of the extending part 171 of the inner hub 17. Hereinbelow, the non-overlapping interposed part 182 close to the tip side of the extending part 171 of the inner hub 17 may be referred to as a first non-overlapping interposed part, and the non-overlapping interposed part 183 close to the base side of the extending part 171 of the inner hub 17 may be referred to as a second non-overlapping interposed part.

Differently from the overlapping interposed part 181, even when the outer hub 16 rotates, a load in the rotation direction RD hardly acts on the non-overlapping interposed parts 182, 183. That is, the non-overlapping interposed parts 182, 183 of the elastic member 18 hardly contribute to power transmission from the engine 6 to the compressor 2.

When the non-overlapping interposed parts 182, 183 of the elastic member 18 are in contact with both the outer hub 16 and the inner hub 17, the spring constant of the elastic member 18 in the axial direction DRax of the shaft 20 increases by friction caused by the contact. The increase in the spring constant of the elastic member 18 in the axial direction DRax of the shaft 20 becomes a factor in deteriorating the responsiveness of coupling and detachment between the rotor 11 and the armature 14 along with on and off of energization of the electromagnet 12, and is thus not preferred.

In view of the above, in the present embodiment, the non-overlapping interposed parts 182, 183 of the elastic member 18 are separated from the outer hub 16 or the inner hub 17. That is, in the present embodiment, the dimension of the non-overlapping interposed parts 182, 183 of the elastic member 18 in the radial direction DRr of the shaft 20 is smaller than the clearance dimension between the outer hub 16 and the inner hub 17 in the non-overlapping part.

Specifically, as illustrated in FIG. 5, a dimension Lga of the non-overlapping interposed part 182 in the radial direction DRr, the non-overlapping interposed part 182 being close to the tip side of the extending part 171 of the inner hub 17, is smaller than a clearance dimension Lca between the outer hub 16 and the inner hub 17 in the non-overlapping part.

Further, a dimension Lgb of the non-overlapping interposed part 183 in the radial direction DRr, the non-overlapping interposed part 183 being close to the base side of the extending part 171 of the inner hub 17, is smaller than a clearance dimension Lcb between the outer hub 16 and the inner hub 17 in the non-overlapping part.

In the present embodiment, the thickness dimension of the non-overlapping interposed parts 182, 183 in the axial direction DRax of the shaft 20 is smaller than the thickness dimension of the overlapping interposed part 181 in the axial direction DRax of the shaft 20.

The elastic member 18 of the present embodiment is disposed between the outer side receiving part 163 and the inner side receiving part 174 in the axial direction DRax of the shaft 20. The outer side receiving part 163 and the inner side receiving part 174 prevent the elastic member 18 of the present embodiment from moving in the axial direction DRax of the shaft 20.

Specifically, in the present embodiment, a part of the elastic member 18 adjacent to the armature 14 faces the inner side receiving part 174 and a part of the elastic member 18 away from the armature 14 faces the outer side receiving part 163 in the axial direction DRax of the shaft 20.

When the elastic member 18 is disposed between the outer side receiving part 163 and the inner side receiving part 174, the elastic member 18 may be disadvantageously compressed toward the armature 14 by the outer side receiving part 163 when the armature 14 and the rotor 11 are coupled together. The compression of the elastic member 18 in the axial direction DRax of the shaft 20 becomes a factor in increasing the spring constant of the elastic member 18 in the axial direction DRax of the shaft 20, and is thus not preferred.

Figure 9:
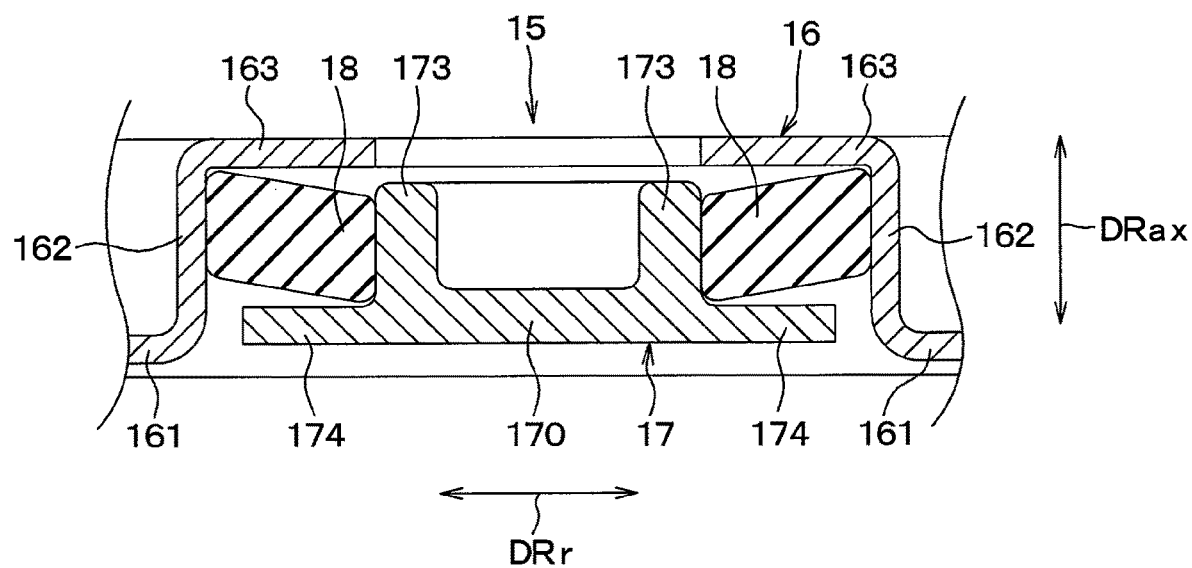
FIG. 9 is a sectional view taken along line IX-IX of FIG. 4.

Thus, the elastic member 18 of the present embodiment has a shape inclined from the outer side toward the inner side with respect to the radial direction DRr of the shaft 20 when disconnecting the armature 14 and the rotor 11 from each other. Specifically, as illustrated in FIG. 9, in the elastic member 18, the end face facing the outer side receiving part 163 has a shape inclined from the outer side toward the inner side so as to approach the armature 14.

Figure 10:
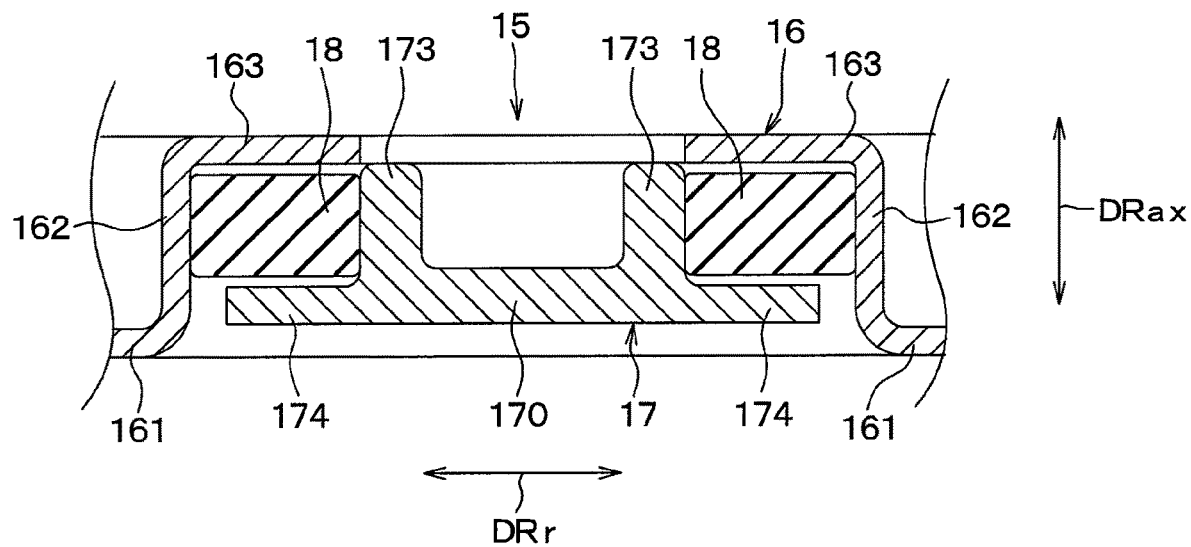
FIG. 10 is an explanatory diagram for describing a state of the elastic member when an armature and a rotor are coupled together.

When the armature 14 and the rotor 11 are disconnected, a clearance is formed between the elastic member 18 and the outer side receiving part 163 in the driven side rotary body 13 of the present embodiment. As illustrated in FIG. 10, when the armature 14 and the rotor 11 are coupled together, the end face of the elastic member 18 facing the outer side receiving part 163 deforms to a shape along the radial direction DRr of the shaft 20 in the driven side rotary body 13 of the present embodiment.

Thus, in the driven side rotary body 13 of the present embodiment, the elastic member 18 is less prone to be compressed toward the armature 14 by the outer side receiving part 163 when the armature 14 and the rotor 11 are coupled together. That is, in the driven side rotary body 13 of the present embodiment, an increase in the spring constant of the elastic member 18 in the axial direction DRax of the shaft 20 is prevented when the armature 14 and the rotor 11 are coupled together.

Figure 11:
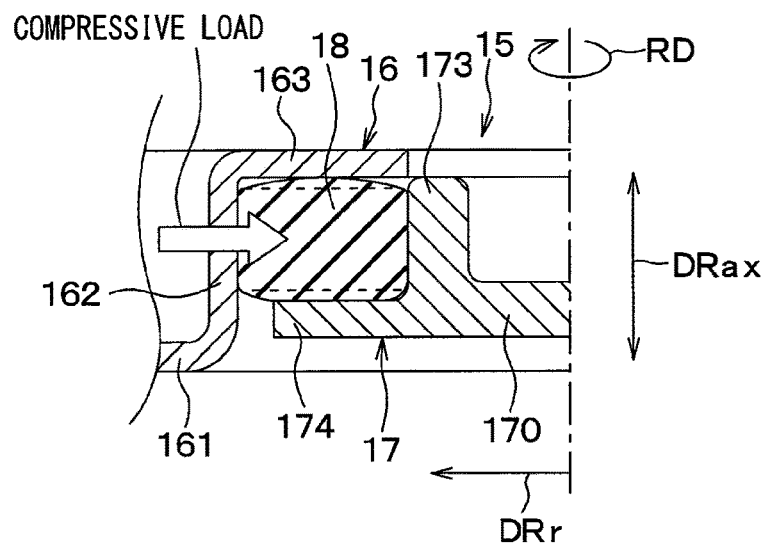
FIG. 11 is an explanatory diagram for describing the relationship between the elastic member and an outer side receiving part when a compressive load acts on the elastic member of the hub of the first embodiment.

As illustrated in FIG. 11, when the armature 14 and the rotor 11 are coupled together, the elastic member 18 may swell in the axial direction DRax of the shaft 20 by a compressive load acting on the elastic member 18 in the rotation direction RD of the shaft 20.

Figure 12:
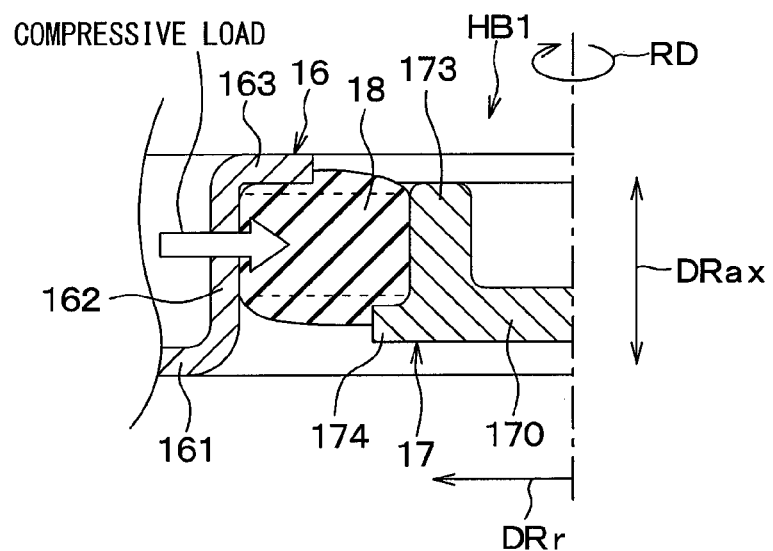
FIG. 12 is an explanatory diagram for describing the relationship between an elastic member and an outer side receiving part when a compressive load acts on the elastic member of a hub which is a first comparative example relative to the first embodiment.

As illustrated in FIG. 12, when a swelling part of the elastic member 18, the swelling part swelling in the axial direction DRax of the shaft 20, faces an edge part of the tip of each of the outer side receiving part 163 and the inner side receiving part 174, the elastic member 18 is apt to crack by contact with the edge part.

FIG. 12 is a schematic sectional view of a hub HB1 which is a first comparative example relative to the hub 15 of the present embodiment. The hub HB1 illustrated in FIG. 12 differs from the hub 15 of the present embodiment in that the length of an outer side receiving part 163 and the length of an inner side receiving part 174 in the radial direction DRr of the shaft 20 are shorter than the length of the outer side receiving part 163 and the length of the inner side receiving part 174 of the hub 15 of the present embodiment, respectively.

In view of the above, in the present embodiment, as illustrated in FIG. 11, the swelling part of the elastic member 18, the swelling part swelling in the axial direction DRax of the shaft 20, is covered with a flat part of the outer side receiving part 163 and a flat part of the inner side receiving part 174. That is, the outer side receiving part 163 of the present embodiment includes the flat part which covers the swelling part which swells in the axial direction DRax of the shaft 20 when a compressive load acts on the elastic member 18. Further, the inner side receiving part 174 of the present embodiment includes the flat part which covers the swelling part which swells in the axial direction DRax of the shaft 20 when a compressive load acts on the elastic member 18.

Next, the operation of the power transmission device 10 of the present embodiment will be described. When the electromagnet 12 is in a non-energized state, no electromagnetic attraction force of the electromagnet 12 is generated. Thus, the armature 14 is held at a position away from the end face part 113 of the rotor 11 by a predetermined distance by the biasing force of the elastic member 18.

Accordingly, the rotary driving force from the engine 6 is transmitted only to the rotor 11 through the V belt 7 without being transmitted to the armature 14 and the hub 15. Thus, only the rotor 11 idles on the ball bearing 19. Thus, the compressor 2 as the driving target device is in a stopped state.

On the other hand, when the electromagnet 12 is in an energized state, the electromagnetic attraction force of the electromagnet 12 is generated. The armature 14 is attracted toward the end face part 113 of the rotor 11 by the electromagnetic attraction force against the biasing force of the elastic member 18. Accordingly, the armature 14 is attracted to the rotor 11. Accordingly, the compressor 2 is actuated by the rotation of the rotor 11 transmitted to the shaft 20 of the compressor 2 through the driven side rotary body 13. That is, the compressor 2 is actuated by the rotary driving force output from the engine 6, the rotary driving force being transmitted to the compressor 2 through the power transmission device 10.

In the driven side rotary body 13 of the present embodiment, the elastic member 18 is interposed between the inner peripheral side of the outer hub 16 and the outer peripheral side of the inner hub 17 so that a compressive load acts on the elastic member 18 in the rotation direction RD of the shaft 20.

Accordingly, when the rotor 11 and the armature 14 are coupled together, the compressive load acts on the elastic member 18 in the rotation direction RD of the shaft 20, which makes it possible to reduce a shearing force acting on the elastic member 18, the shearing force being caused by torsional deformation. It is easier for the elastic member 18 to ensure the compressive strength than the shearing strength because of the characteristics of a rubber material. Thus, the compressive load acting on the elastic member 18 to reduce the shearing force to the elastic member 18 largely contributes to improvement of the durability of the elastic member 18.

Figure 13:
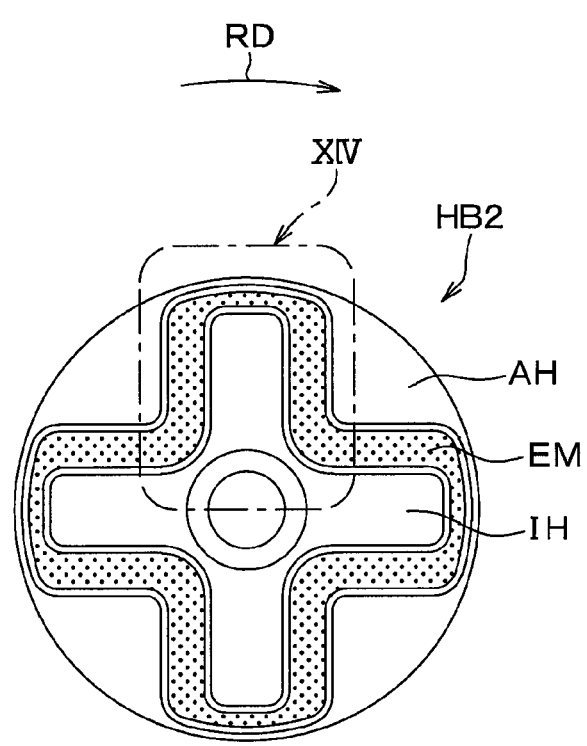
FIG. 13 is a schematic front view of a hub which is a second comparative example relative to the first embodiment.
Figure 14:
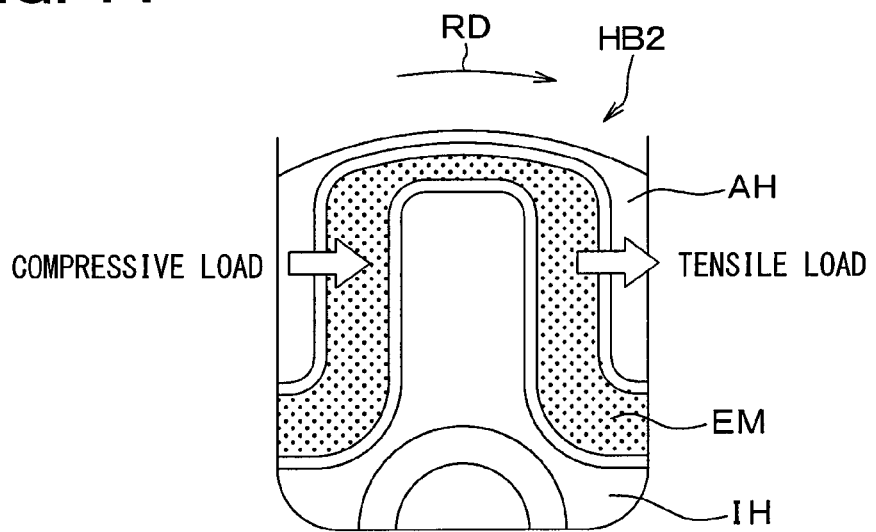
FIG. 14 is an enlarged view of an area XIV of FIG. 13.

FIG. 13 is a schematic front view of a hub HB2 which is a second comparative example relative to the hub 15 of the present embodiment. FIG. 14 is an enlarged view of an area XIV of FIG. 13. The hub HB2 illustrated in FIG. 13 differs from the hub 15 of the present embodiment in that an elastic member EM is bonded to both an outer hub AH and an inner hub IH with an adhesive, and the outer side receiving part 163 and the inner side receiving part 174 are not provided.

In the hub HB2 illustrated in FIG. 13, when the outer hub AH rotates, a tensile load acts on the elastic member EM in addition to a compressive load in the rotation direction RD. Specifically, as illustrated in FIG. 14, when the outer hub AH rotates, a compressive load acts on a part of the elastic member EM where the inner peripheral side of the outer hub AH is located on the rearward side in the rotation direction RD and the outer peripheral side of the inner hub IH is located on the forward side in the rotation direction RD. Further, when the outer hub AH rotates, a tensile load acts on a part of the elastic member EM where the inner peripheral side of the outer hub AH is located on the forward side in the rotation direction RD and the outer peripheral side of the inner hub IH is located on the rearward side in the rotation direction RD.

On the other hand, the elastic member 18 of the present embodiment is disposed in an unbonded state with respect to both the outer hub 16 and the inner hub 17 between the inner peripheral side of the outer side flange part 162 and the outer peripheral side of the inner side flange part 173.

Accordingly, in the present embodiment, when the outer hub 16 rotates, a compressive load acts on the elastic member 18, but no tensile load acts on the elastic member 18. That is, a compressive load acts on parts 181a, 181b, 181c, 181d of the overlapping interposed part 181 of the elastic member 18 where the inner peripheral side of the outer hub 16 is located on the rearward side in the rotation direction RD and the outer peripheral side of the inner hub 17 is located on the forward side in the rotation direction RD. Further, no tensile load acts on parts 181e, 181f, 181g, 181h of the overlapping interposed part 181 of the elastic member 18 where the inner peripheral side of the outer hub 16 is located on the forward side in the rotation direction RD and the outer peripheral side of the inner hub 17 is located on the rearward side in the rotation direction RD.

The power transmission device 10 of the present embodiment described above has a configuration in which a compressive load acts on the elastic member 18, but no tensile load acts on the elastic member 18. Thus, it is possible to improve the strength against the load repeatedly acting on the elastic member 18 along with the transmission of the rotary driving force from the engine 6. As a result, fatigue breakdown of the elastic member 18 in the power transmission device 10 is prevented. Thus, it is possible to improve the durability of the power transmission device 10. That is, even when the power transmission device 10 of the present embodiment is applied to a driving source having large torque fluctuations, a durability can be sufficiently ensured.

In the power transmission device 10 of the present embodiment, the outer hub 16 is provided with the outer side receiving part 163 and the inner hub 17 is provided with the inner side receiving part 174 to prevent coming-off of the elastic member 18.

Accordingly, even when any force acts on the elastic member 18 in the axial direction DRax of the shaft 20 in the configuration in which the elastic member 18 is not bonded to the outer hub 16 and the inner hub 17, the elastic member 18 is less apt to come off.

In addition, each of the outer side receiving part 163 and the inner side receiving part 174 of the present embodiment is provided with the flat part which covers the swelling part which swells in the axial direction DRax of the shaft 20 when a compressive load acts on the elastic member 18.

The configuration in which the swelling part of the elastic member 18 is covered with the flat part of the outer side receiving part 163 and the flat part of the inner side receiving part 174 in this manner makes it possible to prevent the swelling part of the elastic member 18 from being damaged by contact with the edge part of a component around the swelling part.

In the power transmission device 10 of the present embodiment, the elastic member 18 is disposed in a compressed state in the rotation direction RD of the shaft 20 between the outer peripheral side of the inner hub 17 and the inner peripheral side of the outer hub 16.

The configuration in which the elastic member 18 is disposed in a compressed state between the outer peripheral side of the inner hub 17 and the inner peripheral side of the outer hub 16 in this manner eliminates the necessity of drawing for removing a tensile strain which is left during molding of the elastic member 18. Thus, it is possible to improve the productivity of the power transmission device 10.

In the power transmission device 10 of the present embodiment, the dimension of the non-overlapping interposed parts 182, 183 of the elastic member 18 in the radial direction DRr of the shaft 20 is smaller than the clearance dimension between the outer hub 16 and the inner hub 17 in the non-overlapping part. The non-overlapping part is a part where the inner peripheral side of the outer hub 16 and the outer peripheral side of the inner hub 17 do not overlap with each other in the rotation direction RD of the shaft 20.

Accordingly, in the non-overlapping part, the elastic member 18 is easily separated from the outer hub 16 and the inner hub 17. Thus, it is possible to reduce the spring constant of the elastic member 18 in the axial direction DRax of the shaft 20. As a result, it is possible to improve the responsiveness of coupling and detachment between the rotor 11 and the armature 14 along with on and off of energization of the electromagnet 12.

In the present embodiment, the elastic member 18 is made of any of EPDM, NBR, and H-NBR which are rubber materials having high wear resistance. Accordingly, it is possible to reduce wear of the elastic member 18, the wear being caused by friction, in a part in contact with the inner hub 17 and the outer hub 16. As a result, it is possible to increase the life of the elastic member 18.

Second Embodiment

Next, a second embodiment will be described with reference to FIG. 15. The present embodiment differs from the first embodiment in the shapes of an outer hub 16A, an inner hub 17A, and an elastic member 18A which constitute a hub 15A.

Figure 15:
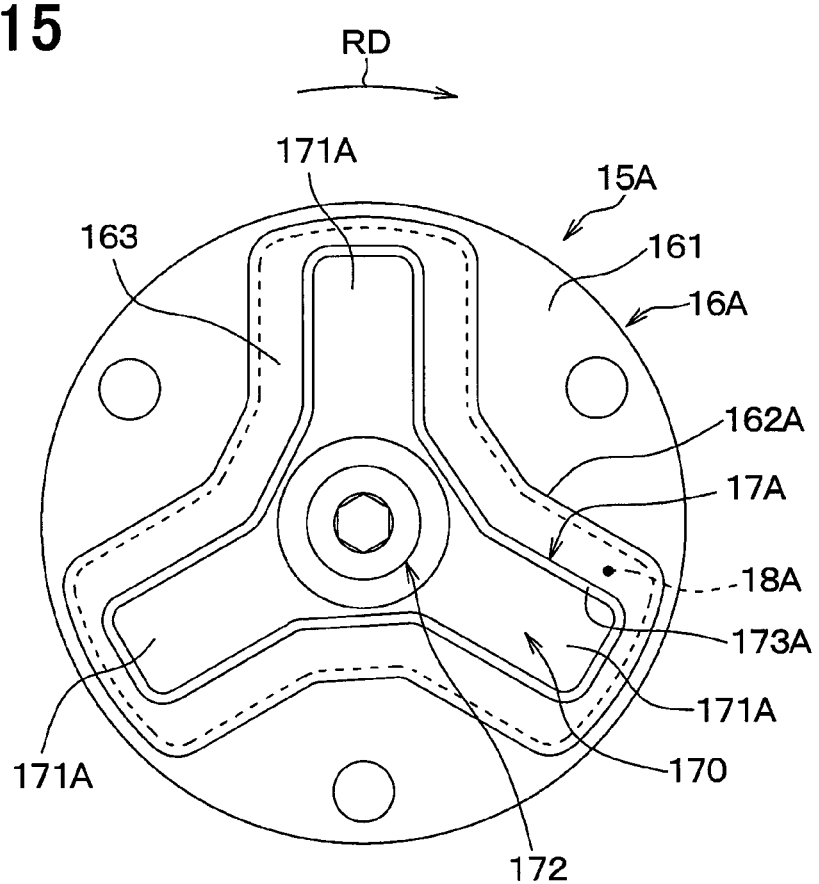
FIG. 15 is a schematic front view of a hub of a power transmission device of a second embodiment.

As illustrated in FIG. 15, the inner hub 17A of the present embodiment is provided with three extending parts 171A on the outer peripheral side thereof. The three extending parts 171A extend outward in the radial direction DRr of the shaft 20. The three extending parts 171A are disposed at regular intervals in the rotation direction RD of the shaft 20. Accordingly, the outer shape of the inner hub 17A is a tridental shape (that is, a Y shape).

The outer hub 16A of the present embodiment has a shape whose inner peripheral side overlaps with the three extending parts 171A in the rotation direction RD of the shaft 20 and surrounds the extending parts 171A.

The elastic member 18A of the present embodiment is disposed between an outer side flange part 162A of the outer hub 16A and an inner side flange part 173A of the inner hub 17A. The elastic member 18A of the present embodiment has a shape corresponding to the shape of a clearance formed between the inner peripheral side of the outer side flange part 162A and the outer peripheral side of the inner side flange part 173A.

The other configuration is similar to the configuration of the first embodiment. The power transmission device 10 of the present embodiment can obtain the effects described in the first embodiment in a manner similar to the power transmission device 10 of the first embodiment.

The present embodiment describes an example in which the inner hub 17A is provided with the three extending parts 171A. However, the number of extending parts 171A of the inner hub 17A is not limited to three, and five or more extending parts 171A may be provided.

Third Embodiment

As described in the above first embodiment, the elastic member 18 has a function as a biasing member which applies a biasing force to the armature 14 in the direction away from the rotor 11 and a function as a buffer member which transmits torque of the outer hub 16 to the inner hub 17 in a buffering manner. In the above first embodiment, the non-overlapping interposed parts 182, 183 of the elastic member 18 are separated from the outer hub 16 and the inner hub 17. Thus, in the first embodiment, the overlapping interposed part 181 of the elastic member 18 functions as the biasing member and the buffer member.

The inventors of the present invention are now considering increasing the spring constant in the overlapping interposed part 181 of the elastic member 18 in the rotation direction RD in order to ensure the durability against torsional deformation in the elastic member 18.

However, since the overlapping interposed part 181 of the elastic member 18 functions as the biasing member and the buffer member, when the spring constant in the rotation direction RD is increased, the spring constant in the axial direction DRax also increases. The increase in the spring constant in the axial direction DRax becomes a factor in reducing the responsiveness of coupling between the rotor 11 and the armature 14 and detachment between the rotor 11 and the armature 14 along with on and off of energization of the electromagnet 12, and is thus not preferred.

In view of the above, a power transmission device 10 of the present embodiment employs a structure in which a non-overlapping interposed part 182 of an elastic member 18 functions as a biasing member, and a function of an overlapping interposed part 181 of the elastic member 18 as a biasing member is lowered.

Hereinbelow, the third embodiment will be described with reference to FIGS. 16 to 22. In the present embodiment, a difference from the first embodiment will be mainly described, and description for a part similar to the first embodiment may be omitted.

Figure 16:
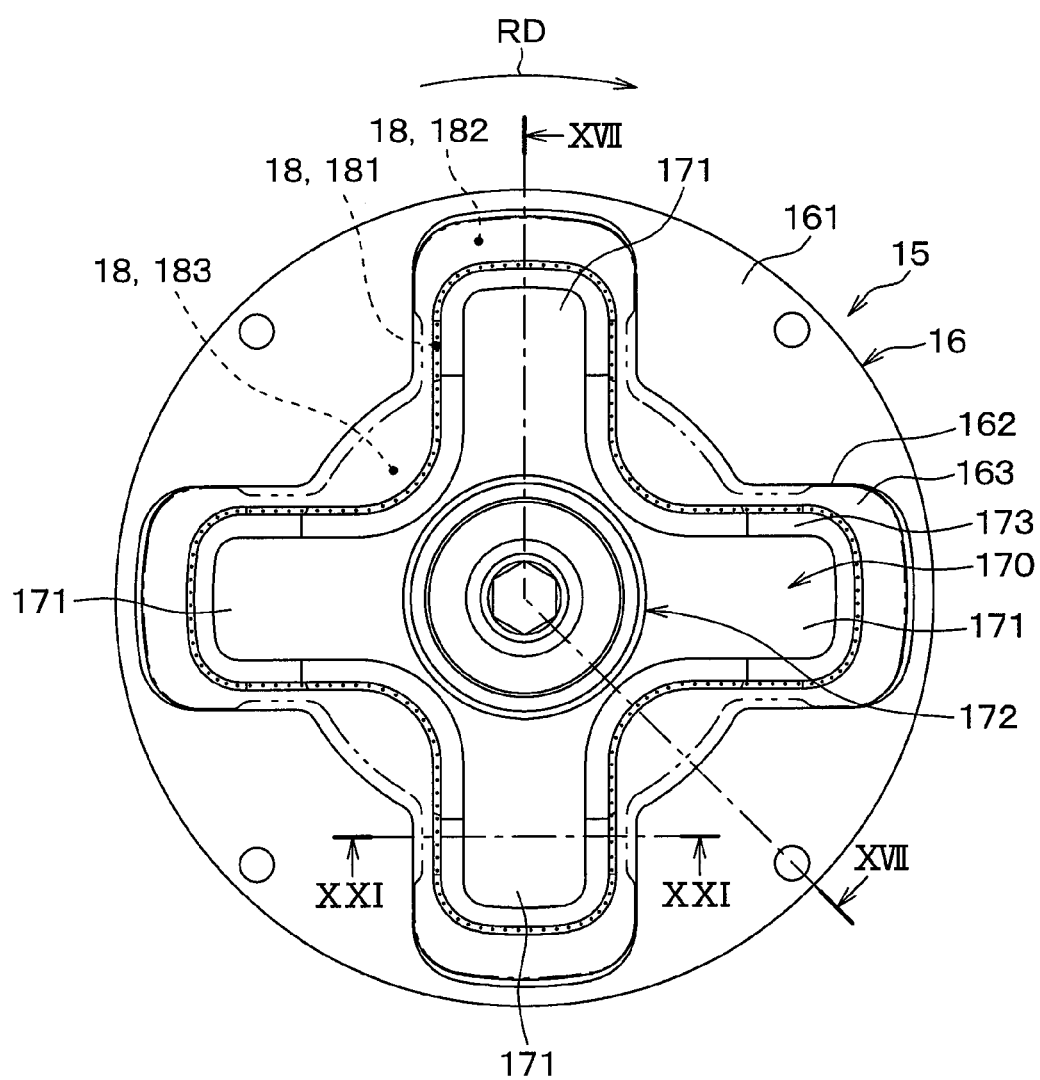
FIG. 16 is a schematic front view of a hub of a power transmission device of a third embodiment.
Figure 17:
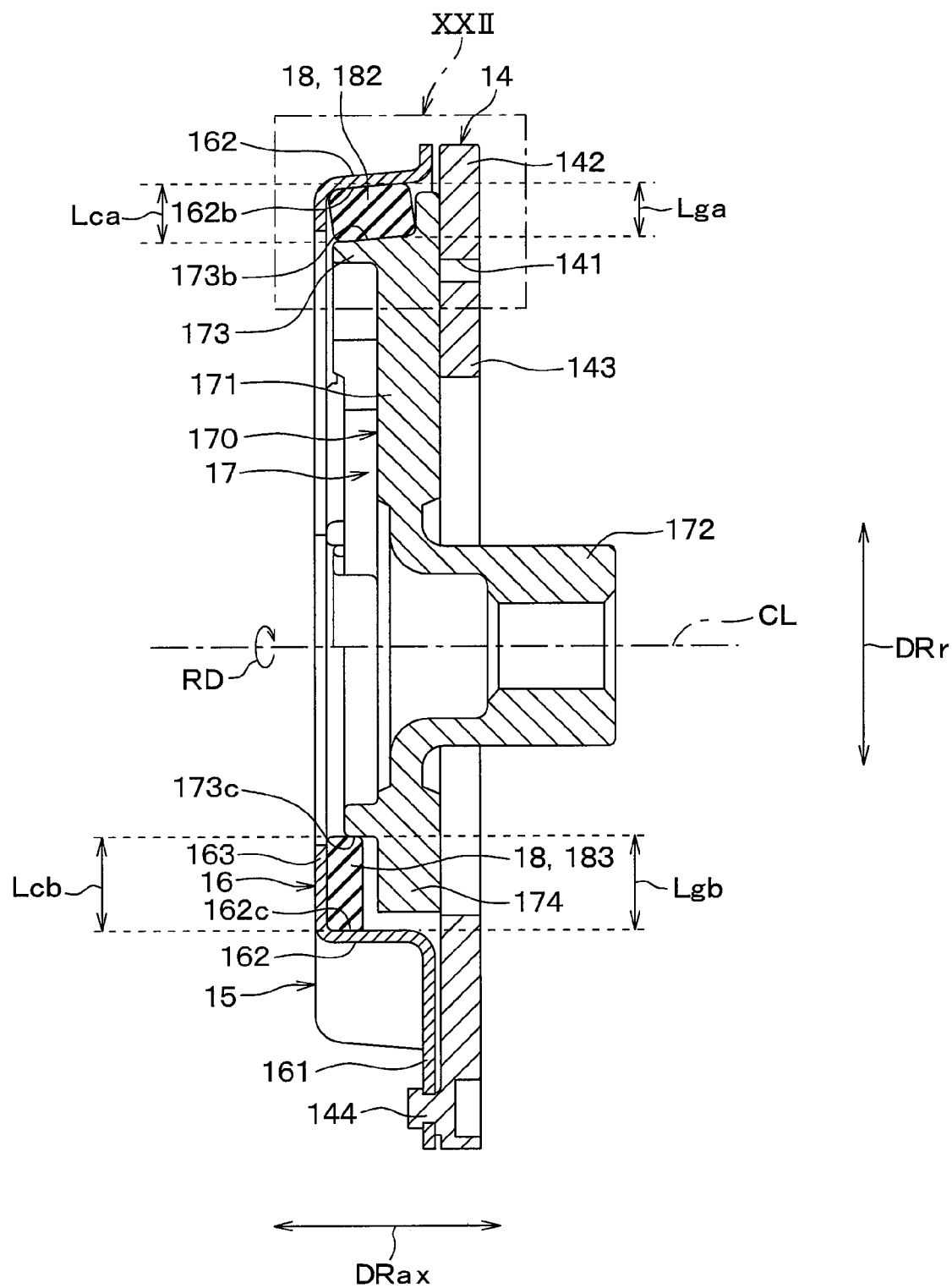
FIG. 17 is a sectional view taken along line XVII-XVII of FIG. 16.

FIG. 16 is a diagram corresponding to FIG. 4 of the first embodiment. FIG. 16 is a front view of a hub 15 in the axial direction DRx of the shaft 20. FIG. 17 is a diagram corresponding to FIG. 5 of the first embodiment.

As illustrated in FIGS. 16 and 17, the hub 15 of the present embodiment includes an outer hub 16, an inner hub 17, and an elastic member 18 similarly to the first embodiment. A chain double-dashed line in FIG. 16 indicates the outer peripheral edge of the elastic member 18.

Figure 18:
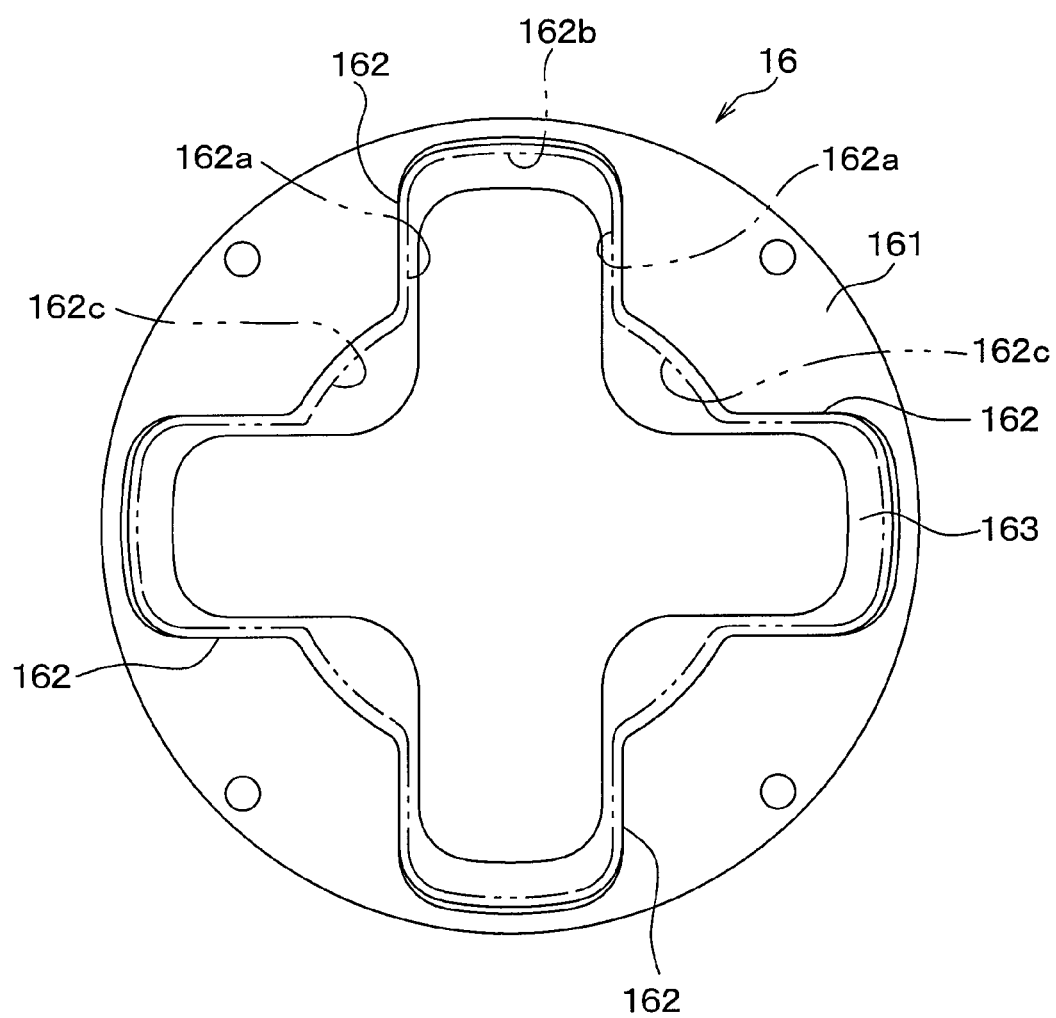
FIG. 18 is a schematic front view of an outer hub of the third embodiment.

As illustrated in FIG. 18, the outer hub 16 of the present embodiment includes an outer side coupling part 161, an outer side flange part 162, and an outer side receiving part 163 similarly to the first embodiment. A chain double-dashed line in FIG. 18 indicates the inner peripheral face of the outer side flange part 162.

The outer side flange part 162 constitutes the inner peripheral side (that is, the inner peripheral face) of the outer hub 16 facing the inner hub 17. The outer side flange part 162 includes a first inner peripheral face 162*a* which overlaps with an inner side flange part 173 in the rotation direction RD of the shaft 20, and a second inner peripheral face 162*b* and a third inner peripheral face 162*c* which do not overlap with the inner side flange part 173 in the rotation direction RD of the shaft 20.

The second inner peripheral face 162*b* of the outer side flange part 162 is formed outside the first inner peripheral face 162*a* in the radial direction DRr of the shaft 20. The third inner peripheral face 162*c* of the outer side flange part 162 is formed inside the first inner peripheral face 162*a* in the radial direction DRr of the shaft 20.

Figure 19:
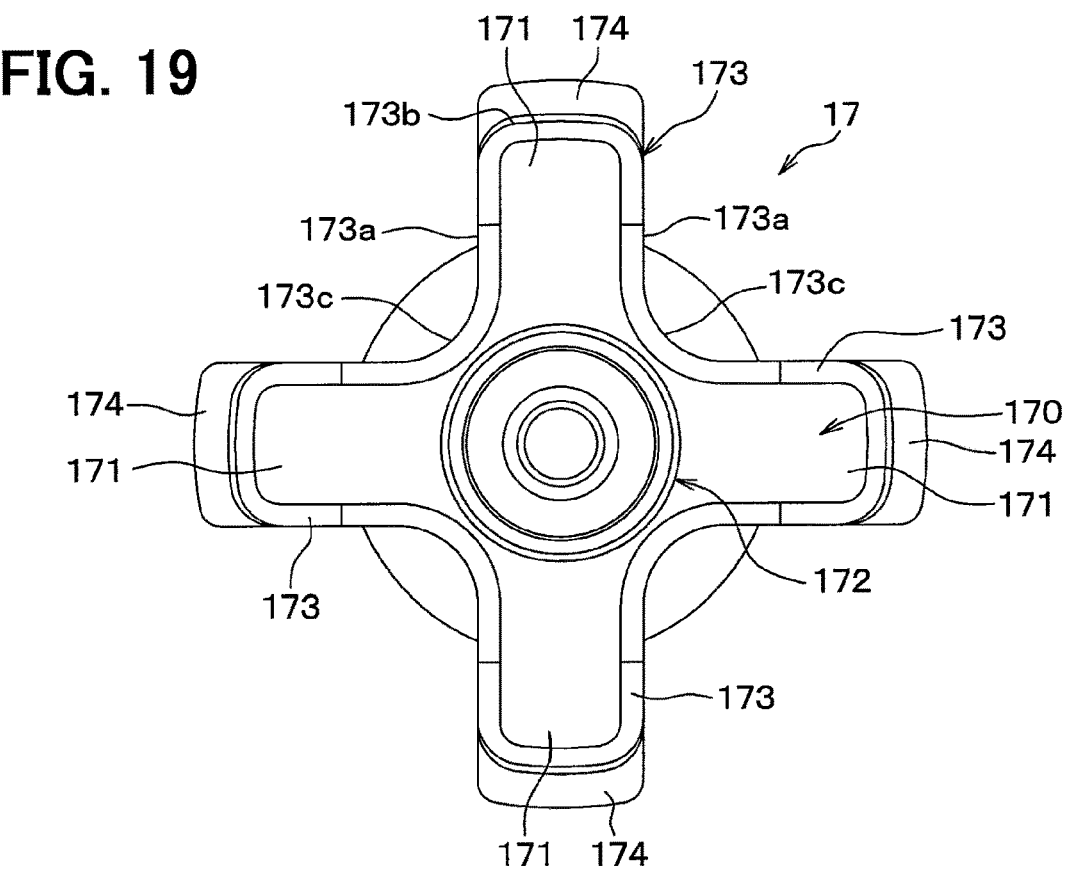
FIG. 19 is a schematic front view of an inner hub of the third embodiment.

As illustrated in FIG. 19, the inner hub 17 of the present embodiment includes an inner side plate-like part 170 including four extending parts 171, a boss part 172, the inner side flange part 173, and an inner side receiving part 174 similarly to the first embodiment.

The inner side flange part 173 constitutes the outer peripheral side (that is, the outer peripheral face) of the inner hub 17 facing the outer hub 16. The inner side flange part 173 includes a first outer peripheral face 173*a* which overlaps with the outer side flange part 162 in the rotation direction RD of the shaft 20, and a second outer peripheral face 173*b* and a third outer peripheral face 173*c* which do not overlap with the outer side flange part 162 in the rotation direction RD of the shaft 20.

The second outer peripheral face 173*b* of the inner side flange part 173 is formed outside the first outer peripheral face 173*a* in the radial direction DRr of the shaft 20. The third outer peripheral face 173*c* of the inner side flange part 173 is formed inside the first outer peripheral face 173*a* in the radial direction DRr of the shaft 20.

The first outer peripheral face 173*a* of the inner side flange part 173 faces the first inner peripheral face 162*a* of the outer side flange part 162 in the rotation direction RD of the shaft 20. The second outer peripheral face 173*b* of the inner side flange part 173 faces the second inner peripheral face 162*b* of the outer side flange part 162 in the radial direction DRr of the shaft 20. The third outer peripheral face 173*c* of the inner side flange part 173 faces the third inner peripheral face 162*c* of the outer side flange part 162 in the radial direction DRr of the shaft 20.

In the present embodiment, the part constituting the first inner peripheral face 162*a* in the outer side flange part 162 and the part constituting the first outer peripheral face 173*a* in the inner side flange part 173 constitute the first facing parts. In the present embodiment, the part constituting the second inner peripheral face 162*b* and the third inner peripheral face 162*c* in the outer side flange part 162 and the part constituting the second outer peripheral face 173*b* and the third outer peripheral face 173*c* in the inner side flange part 173 constitute the second facing parts.

The inner side receiving part 174 of the present embodiment extends outward in the radial direction DRr of the shaft 20 from a part of the inner side plate-like part 170, the part being continuous with the second outer peripheral face 173*b* and the third outer peripheral face 173*c* of the inner side flange part 173. The inner side receiving part 174 of the present embodiment is not formed on a part of the inner side plate-like part 170, the part being continuous with the first outer peripheral face 173*a* of the inner side flange part 173.

Figure 20:
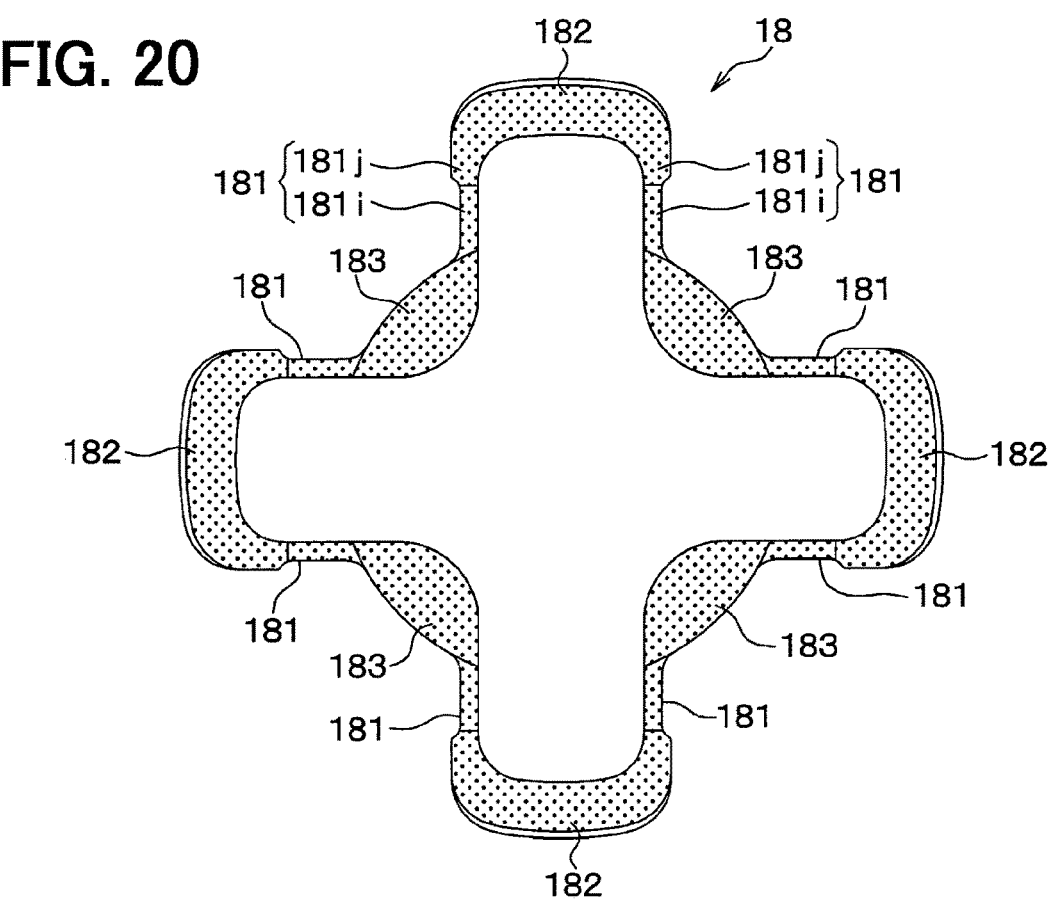
FIG. 20 is a schematic front view of an elastic member of the third embodiment.

As illustrated in FIG. 20, the elastic member 18 includes an overlapping interposed part 181, a first non-overlapping interposed part 182, and a second non-overlapping interposed part 183. The overlapping interposed part 181 is a part of the elastic member 18, the part being interposed between the first inner peripheral face 162*a* of the outer side flange part 162 and the first outer peripheral face 173*a* of the inner side flange part 173. The first non-overlapping interposed part 182 is a part of the elastic member 18, the part being interposed between the second inner peripheral face 162*b* of the outer side flange part 162 and the second outer peripheral face 173*b* of the inner side flange part 173. The second non-overlapping interposed part 183 is a part of the elastic member 18, the part being interposed between the third inner peripheral face 162*c* of the outer side flange part 162 and the third outer peripheral face 173*c* of the inner side flange part 173. The overlapping interposed part 181, the first non-overlapping interposed part 182, and the second non-overlapping interposed part 183 are configured as an integrally molded product which is integrally molded using the same material.

The overlapping interposed part 181 of the present embodiment has a structure different from that of the first embodiment in that a clearance is formed between a part of the overlapping interposed part 181 and at least one of the inner peripheral face of the outer hub 16 and the outer peripheral face of the inner hub 17.

The overlapping interposed part 181 of the present embodiment includes an inner part 181*i* which is located on the inner side in the radial direction DRr of the shaft 20 and an outer part 181*j* which is located on the outer side of the inner part 181*i* in the radial direction DRr of the shaft 20. The overlapping interposed part 181 has a shape in which the outer part 181*j* is in contact with the first inner peripheral face 162*a* of the outer side flange part 162 and the first outer peripheral face 173*a* of the inner side flange part 173 and the inner part 181*i* is separated from the first inner peripheral face 162*a* and the first outer peripheral face 173*a*.

Figure 21:
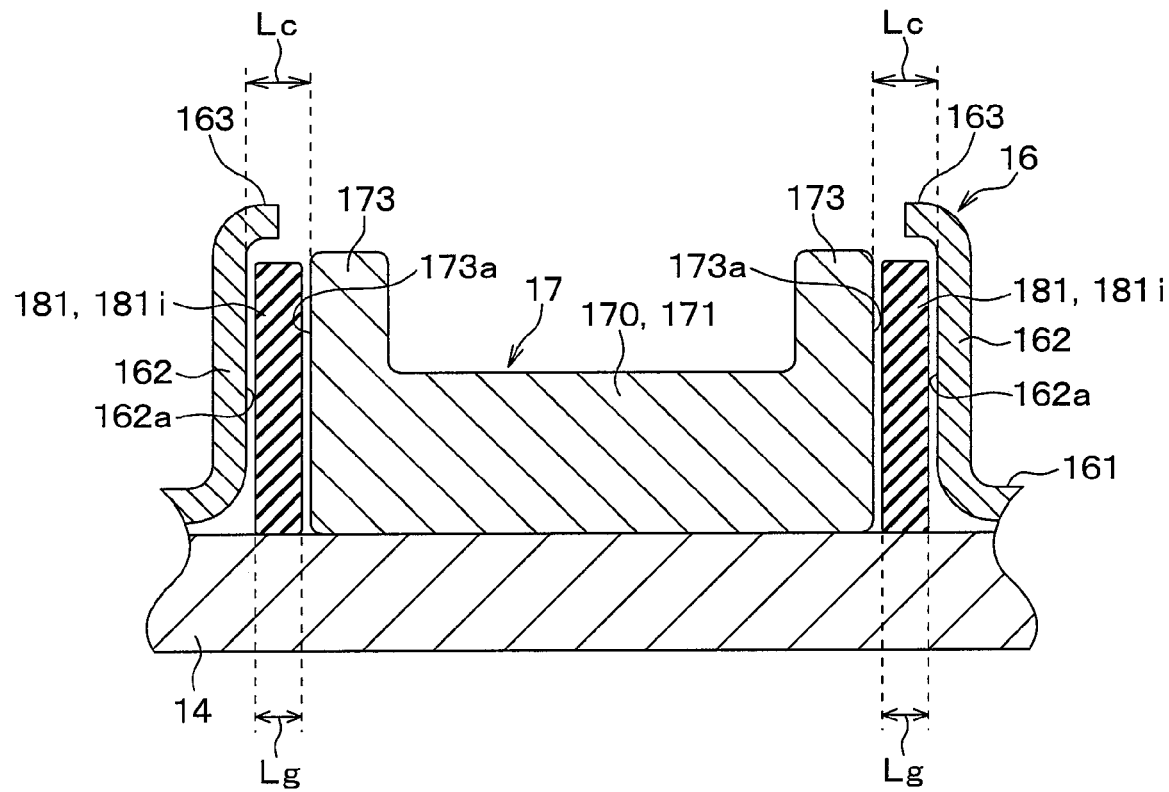
FIG. 21 is a sectional view taken along line XXI-XXI of FIG. 16.

Specifically, as illustrated in FIG. 21, a dimension Lg of the inner part 181*i* of the overlapping interposed part 181 in the direction perpendicular to the radial direction DRr of the shaft 20 is smaller than a clearance dimension Lc between the first inner peripheral face 162*a* and the first outer peripheral face 173*a*.

On the other hand, although not illustrated, the dimension of the outer part 181*j* of the overlapping interposed part 181 in the direction perpendicular to the radial direction DRr of the shaft 20 is substantially equal to the clearance dimension between the first inner peripheral face 162*a* and the first outer peripheral face 173*a*. In the elastic member 18, the outer part 181*j* of the overlapping interposed part 181 functions as a positioning member which defines the position of the shaft 20 in the rotation direction RD.

In the overlapping interposed part 181 of the present embodiment, the inner part 181*i* is separated from the first inner peripheral face 162*a* and the first outer peripheral face 173*a*. Thus, it is possible to lower the function of the overlapping interposed part 181 as the biasing member compared to the first embodiment.

The spring constant in the rotation direction RD of the shaft 20 can be increased by lowering the function of the overlapping interposed part 181 as the biasing member. However, on the other hand, the function as the biasing member in the entire elastic member 18 becomes insufficient.

Thus, the elastic member 18 of the present embodiment is configured in such a manner that, of the first non-overlapping interposed part 182 and the second non-overlapping interposed part 183, the first non-overlapping interposed part 182 is in contact with the outer side flange part 162 and the inner side flange part 173.

As illustrated in FIG. 17, a dimension Lga of the first non-overlapping interposed part 182 of the present embodiment in the radial direction DRr of the shaft 20 is larger than or equal to a clearance dimension Lca between the second inner peripheral face 162*b* of the outer side flange part 162 and the second outer peripheral face 173*b* of the inner side flange part 173. Accordingly, the first non-overlapping interposed part 182 is in contact with the second inner peripheral face 162*b* of the outer side flange part 162 and the second outer peripheral face 173*b* of the inner side flange part 173.

Specifically, the dimension Lga of the first non-overlapping interposed part 182 in the radial direction DRr of the shaft 20 is larger than the clearance dimension Lca between the second inner peripheral face 162*b* and the second outer peripheral face 173*b*. That is, the first non-overlapping interposed part 182 is press-fitted between the inner peripheral side of the outer hub 16 and the outer peripheral side of the inner hub 17.

The dimension of the second non-overlapping interposed part 183 in the radial direction DRr of the shaft 20 is set so that the second non-overlapping interposed part 183 is not in contact with the outer side flange part 162 and the inner side flange part 173. That is, the dimension of the second non-overlapping interposed part 183 in the radial direction DRr of the shaft 20 is smaller than a clearance dimension between the third inner peripheral face 162*c* and the third outer peripheral face 173*c*.

In the configuration in which the first non-overlapping interposed part 182 is press-fitted between the inner peripheral side of the outer hub 16 and the outer peripheral side of the inner hub 17, the assemblability of the elastic member 18 may be disadvantageously deteriorated.

Figure 22:
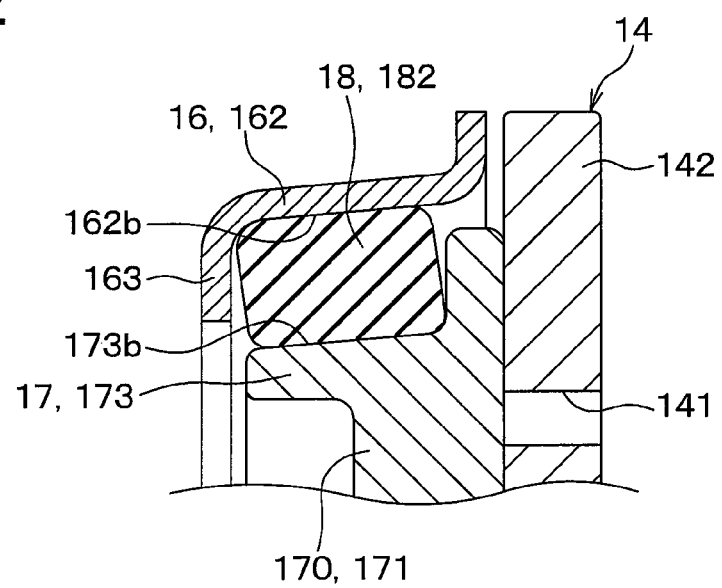
FIG. 22 is an enlarged view of an area XXII of FIG. 17.

Thus, in the present embodiment, the second inner peripheral face 162*b* of the outer side flange part 162 and the second outer peripheral face 173*b* of the inner side flange part 173 have shapes between which the first non-overlapping interposed part 182 is easily press-fitted. Specifically, as illustrated in FIG. 22, the second inner peripheral face 162*b* of the outer side flange part 162 has a tapered shape so that a press-fitting allowance for the elastic member 18 increases from the front side toward the back side in the press-fitting direction of the elastic member 18. The second outer peripheral face 173*b* of the inner side flange part 173 has a tapered shape so that the press-fitting allowance for the elastic member 18 increases from the front side toward the back side in the press-fitting direction of the elastic member 18. In other words, the second inner peripheral face 162*b* of the outer side flange part 162 and the second outer peripheral face 173*b* of the inner side flange part 173 of the present embodiment are reduced in diameter as separating from the armature 14.

The other configuration is similar to the configuration of the first embodiment. The power transmission device 10 of the present embodiment can obtain the effects achieved by the configuration in common with the first embodiment in a manner similar to the power transmission device 10 of the first embodiment.

In particular, the power transmission device 10 of the present embodiment has a structure in which the non-overlapping interposed part 182 of the elastic member 18 functions as the biasing member, and the function of the overlapping interposed part 181 of the elastic member 18 as the biasing member is lowered.

Accordingly, even when the spring constant in the overlapping interposed part 181 of the elastic member 18 in the rotation direction RD of the shaft 20 is changed, it is possible to reduce the influence on the spring constant in the axial direction DRax of the shaft 20 caused by the change.

Thus, it is possible to ensure the responsiveness of coupling between the rotor 11 and the armature 14 and detachment between the rotor 11 and the armature 14 along with on and off of energization of the electromagnet 12 while improving the durability of the elastic member 18 in the rotation direction RD of the shaft 20.

Further, in the power transmission device 10 of the present embodiment, the second inner peripheral face 162*b* of the outer side flange part 162 and the second outer peripheral face 173*b* of the inner side flange part 173 have shapes between which the first non-overlapping interposed part 182 is easily press-fitted. Thus, it is possible to improve the assemblability of the elastic member 18.

Modification of Third Embodiment

The above third embodiment describes an example in which the outer part 181*j* of the overlapping interposed part 181 is in contact with the first inner peripheral face 162*a* of the outer side flange part 162 and the first outer peripheral face 173*a* of the inner side flange part 173. However, the present disclosure is not limited thereto. The elastic member 18 may, for example, have a shape in which the outer part 181*j* of the overlapping interposed part 181 is separated from the first inner peripheral face 162*a* of the outer side flange part 162 and the first outer peripheral face 173*a* of the inner side flange part 173.

The above third embodiment describes an example in which the inner part 181*i* of the overlapping interposed part 181 is separated from the first inner peripheral face 162*a* and the first outer peripheral face 173*a*. However, the present disclosure is not limited thereto. The overlapping interposed part 181 may have a shape in which the inner part 181*i* is separated from at least one of the first inner peripheral face 162*a* and the first outer peripheral face 173*a*.

The above third embodiment describes an example in which, of the first non-overlapping interposed part 182 and the second non-overlapping interposed part 183, the first non-overlapping interposed part 182 is in contact with the outer side flange part 162 and the inner side flange part 173. However, the present disclosure is not limited thereto. The elastic member 18 may, for example, have a shape in which each of the first non-overlapping interposed part 182 and the second non-overlapping interposed part 183 is in contact with the outer side flange part 162 and the inner side flange part 173. The elastic member 18 may have a shape in which, of the first non-overlapping interposed part 182 and the second non-overlapping interposed part 183, the second non-overlapping interposed part 183 is in contact with the outer side flange part 162 and the inner side flange part 173.

The above third embodiment describes an example in which the second inner peripheral face 162b of the outer side flange part 162 and the second outer peripheral face 173b of the inner side flange part 173 have shapes between which the first non-overlapping interposed part 182 is easily press-fitted. However, the present disclosure is not limited thereto. The elastic member 18 may, for example, have a shape in which the second inner peripheral face 162b of the outer side flange part 162 and the second outer peripheral face 173b of the inner side flange part 173 extend in the axial direction DRax of the shaft 20.

Fourth Embodiment

Next, a fourth embodiment will be described with reference to FIGS. 23 and 24. The present embodiment differs from the third embodiment in that at least a part of an overlapping interposed part 181 of an elastic member 18 is provided with a resistance reducer which reduces a frictional resistance produced against at least one of an inner peripheral face of an outer hub 16 and an outer peripheral face of an inner hub 17.

Figure 23:
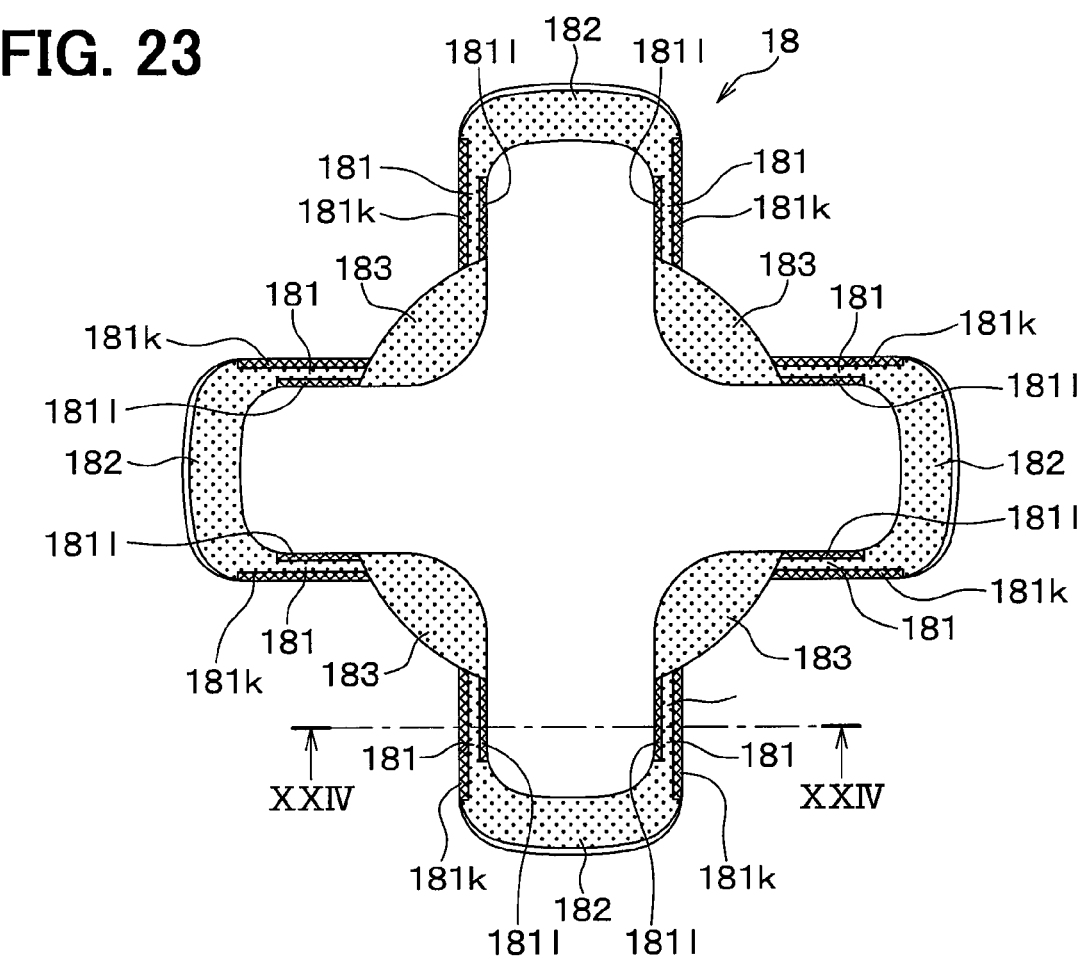
FIG. 23 is a schematic front view of an elastic member of a fourth embodiment.
Figure 24:
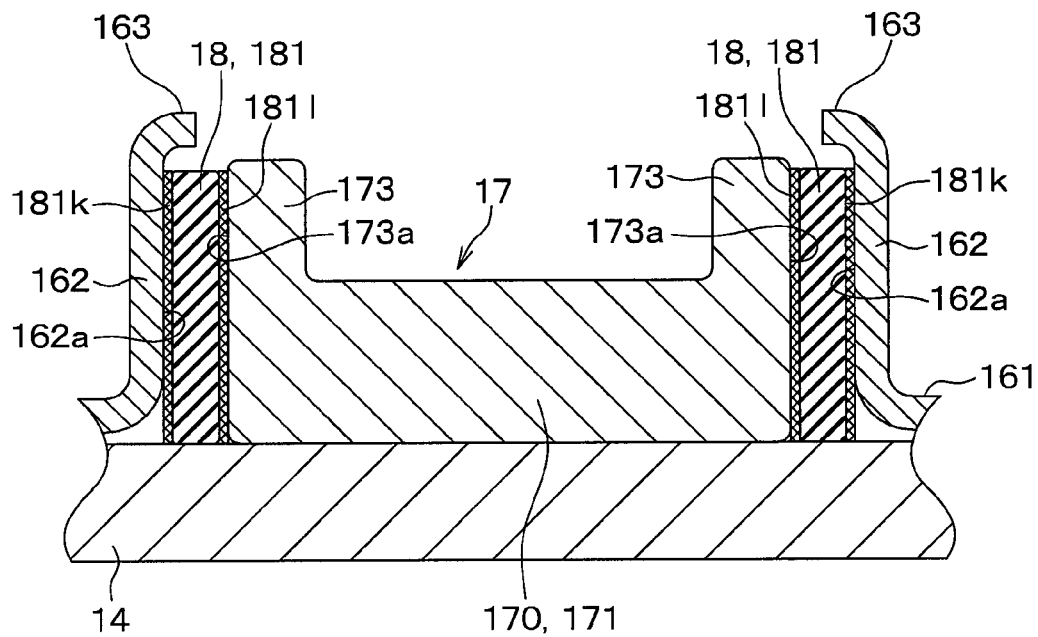
FIG. 24 is a sectional view taken along line XXIV-XXIV of FIG. 23.

As illustrated in FIGS. 23 and 24, the overlapping interposed part 181 of the present embodiment has a shape that is in contact with a first inner peripheral face 162a of an outer side flange part 162 and a first outer peripheral face 173a of an inner side flange part 173.

In the overlapping interposed part 181 of the present embodiment, a surface treatment for reducing the frictional resistance is applied to a first facing face 181k which faces the first inner peripheral face 162a and a second facing face 181l which faces the first outer peripheral face 173a. For example, a treatment of applying a lubricating material onto the surface can be employed as the surface treatment for reducing the frictional resistance. In the present embodiment, the first facing face 181k and the second facing face 181l of the overlapping interposed part 181 constitute the resistance reducer.

The other configuration is similar to that of the third embodiment. In the present embodiment, since the surface treatment for reducing the frictional resistance is applied to the overlapping interposed part 181, it is possible to lower the function of the overlapping interposed part 181 of the elastic member 18 as the biasing member. Thus, the power transmission device 10 of the present embodiment can obtain effects similar to the effects of the third embodiment.

Modification of Fourth Embodiment

The above fourth embodiment describes an example in which the surface treatment for reducing the frictional resistance is applied to the first facing face 181k and the second facing face 181l of the overlapping interposed part 181. However, the present disclosure is not limited thereto. The elastic member 18 may, for example, have a configuration in which the surface treatment for reducing the frictional resistance is applied to either the first facing face 181k or the second facing face 181l of the overlapping interposed part 181.

Fifth Embodiment

Next, a fifth embodiment will be described with reference to FIG. 25. The present embodiment differs from the third embodiment in that at least a part of an overlapping interposed part 181 of an elastic member 18 is provided with a resistance reducer which reduces a frictional resistance produced against at least one of an inner peripheral face of an outer hub 16 and an outer peripheral face of an inner hub 17.

Figure 25:
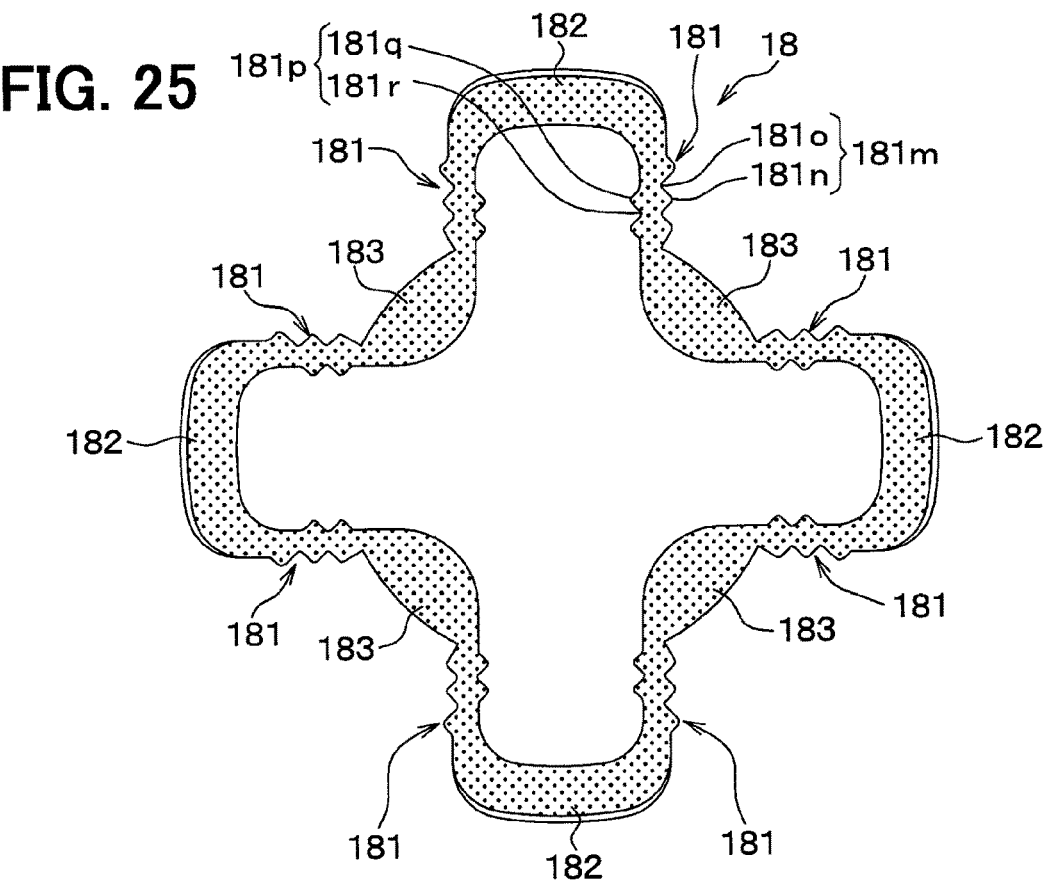
FIG. 25 is a schematic front view of an elastic member of a fifth embodiment.

As illustrated in FIG. 25, in the overlapping interposed part 181 of the present embodiment, a first facing part 181m which faces a first inner peripheral face 162a is provided with a plurality of projections 181n each of which projects toward the first inner peripheral face 162a and a separated part 181o which is separated from the second inner peripheral face 162b. The projecting length of the projections 181n is set so that the projections 181n are in contact with the first inner peripheral face 162a.

In the overlapping interposed part 181 of the present embodiment, since the first facing part 181m is provided with the projections 181n and the separated part 181o, the contact area with the inner peripheral face of the outer hub 16 is reduced.

Further, in the overlapping interposed part 181 of the present embodiment, a second facing part 181p which faces a first outer peripheral face 173a is provided with a plurality of projections 181q each of which projects toward the first outer peripheral face 173a and a separated part 181r which is separated from the second outer peripheral face 173b. The projecting length of the projections 181q is set so that the projections 181q are in contact with the first outer peripheral face 173a.

In the overlapping interposed part 181 of the present embodiment, since the second facing part 181p is provided with the projections 181q and the separated part 181r, the contact area with the outer peripheral face of the inner hub 17 is reduced. In the present embodiment, the first facing part 181m which is provided with the projections 181n and the separated part 181o and the second facing part 181p which is provided with the projections 181q and the separated part 181r in the overlapping interposed part 181 constitute the resistance reducer.

The other configuration is similar to that of the third embodiment. In the present embodiment, the overlapping interposed part 181 has a structure having a small contact area with each of the hubs 16, 17. Thus, it is possible to lower the function of the overlapping interposed part 181 of the elastic member 18 as the biasing member. Thus, the power transmission device 10 of the present embodiment can obtain effects similar to the effects of the third embodiment.

Modification of Fifth Embodiment

The above fifth embodiment describes an example in which each of the first facing part 181m and the second facing part 181p of the overlapping interposed part 181 has an uneven shape. However, the present disclosure is not limited thereto. In the elastic member 18, either the first facing part 181m or the second facing part 181p of the overlapping interposed part 181 may have an uneven shape.

Sixth Embodiment

Next, a sixth embodiment will be described with reference to FIG. 26. The present embodiment differs from the third embodiment in that a part of the outer side flange part 162 and a part of the inner side flange part 173 are provided with a resistance reducer which reduces a frictional resistance produced against the elastic member 18.

Figure 26:
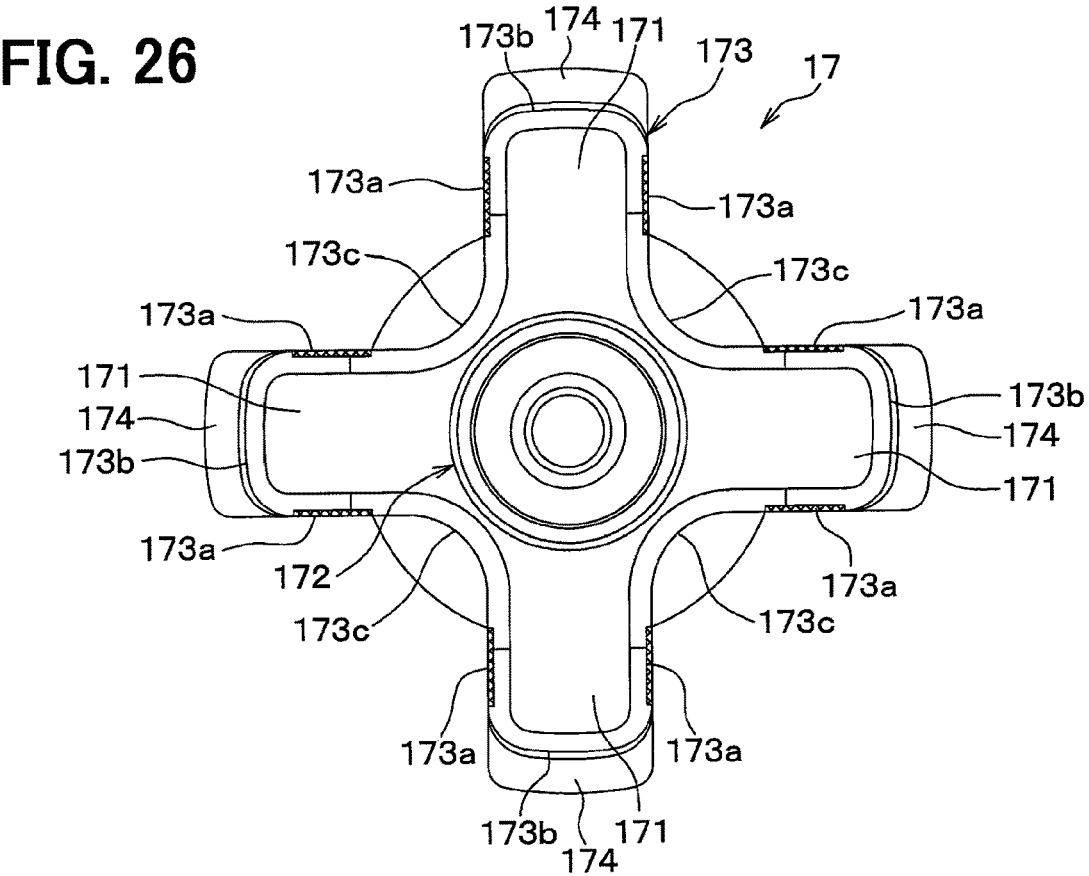
FIG. 26 is a schematic front view of an inner hub of a sixth embodiment.

As illustrated in FIG. 26, the inner side flange part 173 of the present embodiment has a shape in which a first outer peripheral face 173*a* is in contact with an overlapping interposed part 181 of the elastic member 18. A surface treatment for reducing the frictional resistance is applied to the first outer peripheral face 173*a* of the inner side flange part 173. Examples of the surface treatment for reducing the frictional resistance include a treatment of applying a lubricating material onto the surface and a treatment of coating the surface with a lubricating material.

Although not illustrated, the outer side flange part 162 has a shape in which a first inner peripheral face 162*a* is in contact with the overlapping interposed part 181 of the elastic member 18. A surface treatment for reducing the frictional resistance is applied to the first inner peripheral face 162*a* of the outer side flange part 162. Examples of the surface treatment for reducing the frictional resistance include a treatment of applying a lubricating material onto the surface and a treatment of coating the surface with a lubricating material.

In the present embodiment, the first inner peripheral face 162*a* of the outer side flange part 162 and the first outer peripheral face 173*a* of the inner side flange part 173 constitute the resistance reducer for reducing the frictional resistance produced against the elastic member 18.

The other configuration is similar to that of the third embodiment. In the present embodiment, the surface treatment for reducing the frictional resistance is applied to the first inner peripheral face 162*a* of the outer side flange part 162 and the first outer peripheral face 173*a* of the inner side flange part 173. Thus, it is possible to lower the function of the overlapping interposed part 181 of the elastic member 18 as the biasing member. Thus, the power transmission device 10 of the present embodiment can obtain effects similar to the effects of the third embodiment.

Modification of Sixth Embodiment

The above sixth embodiment describes an example in which the surface treatment for reducing the frictional resistance is applied to the first inner peripheral face 162*a* of the outer side flange part 162 and the first outer peripheral face 173*a* of the inner side flange part 173. However, the present disclosure is not limited thereto. The hub 15 may, for example, have a configuration in which the surface treatment for reducing the frictional resistance is applied to either the first inner peripheral face 162*a* of the outer side flange part 162 or the first outer peripheral face 173*a* of the inner side flange part 173.

Seventh Embodiment

Next, a seventh embodiment will be described with reference to FIG. 27. The present embodiment differs from the third embodiment in that a part of the outer side flange part 162 and a part of the inner side flange part 173 are provided with a resistance reducer which reduces a frictional resistance produced against the elastic member 18.

Figure 27:
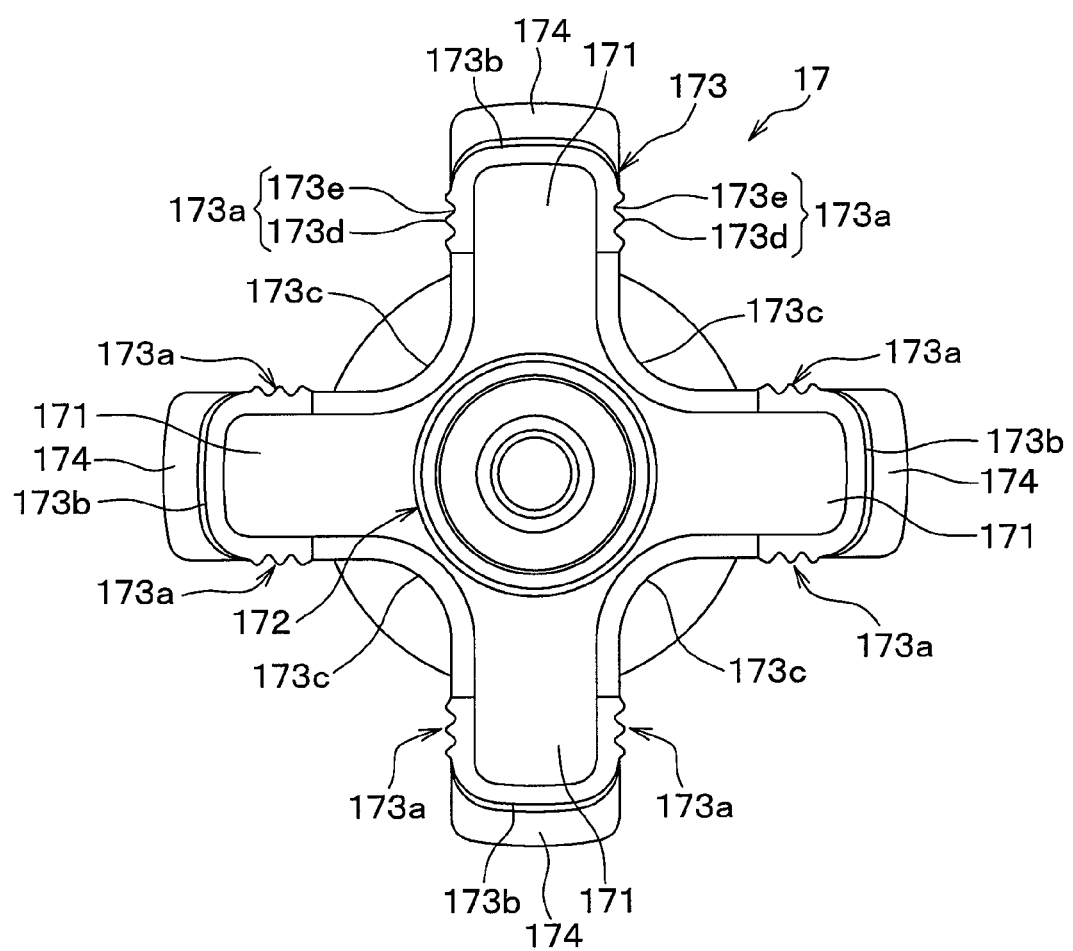
FIG. 27 is a schematic front view of an inner hub of a seventh embodiment.

As illustrated in FIG. 27, in the inner side flange part 173 of the present embodiment, a first outer peripheral face 173*a* is provided with a plurality of projections 173*d* each of which projects toward an overlapping interposed part 181 of the elastic member 18 and a separated part 173*e* which is separated from the overlapping interposed part 181. The projecting length of the projections 173*d* is set so that the projections 173*d* are in contact with the overlapping interposed part 181 of the elastic member 18.

In the inner side flange part 173 of the present embodiment, since the first outer peripheral face 173*a* is provided with the projections 173*d* and the separated part 173*e*, the contact area with the elastic member 18 is reduced.

Although not illustrated, in the outer side flange part 162 of the present embodiment, a first inner peripheral face 162*a* is provided with a plurality of projections 162*d* each of which projects toward the overlapping interposed part 181 of the elastic member 18 and a separated part 162*e* which is separated from the overlapping interposed part 181. The projecting length of the projections 162*d* is set so that the projections 162*d* are in contact with the overlapping interposed part 181 of the elastic member 18.

In the outer side flange part 162 of the present embodiment, since the first inner peripheral face 162*a* is provided with the projections 162*d* and the separated part 162*e*, the contact area with the elastic member 18 is reduced.

In the present embodiment, the first outer peripheral face 173*a* which is provided with the projections 173*d* and the separated part 173*e* in the inner side flange part 173 and the first inner peripheral face 162*a* which is provided with the projections 162*d* and the separated part 162*e* in the outer side flange part 162 constitute the resistance reducer.

The other configuration is similar to that of the third embodiment. In the present embodiment, the overlapping interposed part 181 has a structure having a small contact area with each of the hubs 16, 17. Thus, it is possible to lower the function of the overlapping interposed part 181 of the elastic member 18 as the biasing member. Thus, the power transmission device 10 of the present embodiment can obtain effects similar to the effects of the third embodiment.

Modification of Seventh Embodiment

The above seventh embodiment describes an example in which each of the first outer peripheral face 173*a* of the inner side flange part 173 and the first inner peripheral face 162*a* of the outer side flange part 162 has an uneven shape. However, the present disclosure is not limited thereto. In the hub 15, for example, either the first outer peripheral face 173*a* of the inner side flange part 173 or the first inner peripheral face 162*a* of the outer side flange part 162 may have an uneven shape.

Other Embodiments

The representative embodiments of the present disclosure have been described above. However, the present disclosure is not limited to the above embodiments and can be variously modified as described below.

Each of the above embodiments describes an example in which the elastic member 18 is not bonded to both the outer hub 16 and the inner hub 17 so that no tensile load acts on the elastic member 18. However, the present disclosure is not limited thereto. The elastic member 18 may be bonded to either the outer hub 16 or the inner hub 17 and may not be bonded to the other.

When the durability of the elastic member 18 is taken into consideration, the elastic member 18 is desirably bonded to the outer peripheral side of the inner hub 17, and not bonded to the outer hub 16. This is because a force acting on the elastic member 18 when the elastic member 18 is bonded to the outer peripheral side of the inner hub 17 is smaller than a force acting on the elastic member 18 when the elastic member 18 is bonded to the inner peripheral side of the outer hub 16.

As described in each of the above embodiments, the power transmission device 10 desirably has a configuration in which the outer hub 16 is provided with the outer side receiving part 163 and the inner hub 17 is provided with the inner side receiving part 174 to prevent coming-off of the elastic member 18. However, the present disclosure is not limited thereto.

The power transmission device 10 may, for example, have a configuration in which either the outer side receiving part 163 or the inner side receiving part 174 is omitted or a configuration in which both the outer side receiving part 163 and the inner side receiving part 174 are omitted.

As described in each of the above embodiments, the power transmission device 10 desirably has a configuration in which the swelling part of the elastic member 18 is covered with the flat part of the outer side receiving part 163 and the flat part of the inner side receiving part 174. However, the present disclosure is not limited thereto.

As illustrated in FIG. 12, the power transmission device 10 may, for example, have a configuration in which each of the tip part of the outer side receiving part 163 and the tip part of the inner side receiving part 174 faces the swelling part of the elastic member 18.

As described in each of the above embodiments, the power transmission device 10 desirably has a configuration in which the elastic member 18 is disposed in a compressed state between the outer peripheral side of the inner hub 17 and the inner peripheral side of the outer hub 16. However, the present disclosure is not limited thereto. The power transmission device 10 may, for example, have a configuration in which the elastic member 18 is disposed in an uncompressed state between the outer peripheral side of the inner hub 17 and the inner peripheral side of the outer hub 16.

As described in each of the above embodiments, in the power transmission device 10, the dimension of each of the non-overlapping interposed parts 182, 183 of the elastic member 18 is desirably smaller than the clearance dimension between the outer hub 16 and the inner hub 17 in the non-overlapping part. However, the present disclosure is not limited thereto.

In the power transmission device 10, for example, the dimension of each of the non-overlapping interposed parts 182, 183 of the elastic member 18 may be equal to or larger than the clearance dimension between the outer hub 16 and the inner hub 17 in the non-overlapping part.

As described in each of the above embodiments, in the power transmission device 10, the elastic member 18 is desirably made of any of EPDM, NBR, and H-NBR which are rubber materials having high wear resistance. However, the present disclosure is not limited thereto. In the power transmission device 10, the elastic member 18 may be made of a material other than EPDM, NBR, and H-NBR (e.g., CI-IIR).

As described in each of the above embodiments, in the power transmission device 10, the end face of the elastic member 18, the end face facing the outer side receiving part 163, desirably has a shape inclined from the outer side toward the inner side so as to approach the armature 14. However, the present disclosure is not limited thereto. In the power transmission device 10, the end face of the elastic member 18, the end face facing the outer side receiving part 163, may, for example, have a shape extending in the radial direction DRr of the shaft 20. The thickness dimension of the elastic member 18 in the axial direction DRax of the shaft 20 may be nonuniform.

Each of the above embodiments describes an example in which the elastic member 18 is configured as the integrally molded product formed by integrally molding the overlapping interposed part 181 and the non-overlapping interposed parts 182, 183. However, the present disclosure is not limited thereto. In the elastic member 18, for example, the overlapping interposed part 181 and the non-overlapping interposed parts 182, 183 may be separately formed.

Each of the above embodiments describes an example in which the power transmission device 10 of the present disclosure is applied to transmission and interruption of the rotary driving force from the engine 6 to the compressor 2. However, the present disclosure is not limited thereto. The power transmission device 10 of the present disclosure is, for example, applicable also to a device that transmits a rotary driving force output from a driving source such as the engine 6 or an electric motor to a generator.

In the respective embodiments above, it goes without saying that elements forming the embodiments are not necessarily essential unless specified as being essential or deemed as being apparently essential in principle.

In a case where a reference is made to the components of the respective embodiments as to numerical values, such as the number, values, amounts, and ranges, the components are not limited to the numerical values unless specified as being essential or deemed as being apparently essential in principle.

Also, in a case where a reference is made to the components of the respective embodiments above as to shapes and positional relations, the components are not limited to the shapes and the positional relations unless explicitly specified or limited to particular shapes and positional relations in principle.

According to a first aspect represented by a part or all of the embodiments, a power transmission device includes an electromagnet, a rotor, an armature, and a hub. The hub includes an outer hub coupled to the armature, an inner hub coupled to the shaft, and an elastic member interposed between the outer hub and the inner hub. An outer peripheral side of the inner hub includes a plurality of extending parts, each extending outward in a radial direction of the shaft. An inner peripheral side of the outer hub includes an inner peripheral side wall that overlaps with the extending parts in a rotation direction of the shaft and surrounds the extending parts. The elastic member is disposed in an unbonded state with respect to at least one of the inner hub and the outer hub between the outer peripheral side of the inner hub and the inner peripheral side of the outer hub.

According to a second aspect, in the power transmission device, the outer hub includes an outer side receiving part that faces the elastic member in an axial direction of the shaft to restrict the elastic member from moving in the axial direction of the shaft; and the inner hub includes an inner side receiving part that faces the elastic member in the axial direction of the shaft to restrict the elastic member from moving in the axial direction of the shaft.

Accordingly, when force acts on the elastic member in the axial direction of the shaft in the configuration in which the elastic member is not bonded to at least one of the outer hub and the inner hub, the elastic member is less apt to come off.

According to a third aspect, in the power transmission device, the outer side receiving part includes a flat part that covers a swelling part swelling in the axial direction of the shaft when a compressive load acts on the elastic member, and the inner side receiving part includes a flat part that covers a swelling part swelling in the axial direction of the shaft when a compressive load acts on the elastic member.

The swelling part of the elastic member is covered with the flat part of the outer side receiving part and the flat part of the inner side receiving part. Thus, it is possible to prevent the swelling part of the elastic member from being damaged by contact with the edge part of a component around the swelling part.

According to a fourth aspect, in the power transmission device, the elastic member is disposed in a compressed state in the rotation direction of the shaft between the outer peripheral side of the inner hub and the inner peripheral side of the outer hub. When the elastic member is disposed in a compressed state between the outer peripheral side of the inner hub and the inner peripheral side of the outer hub, it is possible to eliminate the necessity of drawing for removing a tensile strain which is left during molding of the elastic member. Thus, it is possible to improve the productivity of the power transmission device.

According to a fifth aspect, in the power transmission device, the outer hub and the inner hub have a non-overlapping part where the inner peripheral side of the outer hub and the outer peripheral side of the inner hub do not overlap with each other in the rotation direction of the shaft. In the non-overlapping part, a dimension of the elastic member in the radial direction of the shaft is smaller than a clearance dimension between the outer hub and the inner hub. Accordingly, in the non-overlapping part, the elastic member is easily separated from the outer hub and the inner hub. Thus, it is possible to reduce the spring constant of the elastic member in the axial direction of the shaft. As a result, it is possible to improve the responsiveness of coupling and detachment between the rotor and the armature along with on and off of energization of the electromagnet.

According to a sixth aspect, in the power transmission device, the inner peripheral side of the outer hub and the outer peripheral side of the inner hub face each other at a facing part. The facing part has a first facing part where the inner peripheral side of the outer hub and the outer peripheral side of the inner hub face each other in the rotation direction of the shaft, and a second facing part where the inner peripheral side of the outer hub and the outer peripheral side of the inner hub do not face each other in the rotation direction of the shaft. The elastic member is configured in such a manner that at least a part of the elastic member disposed at the second facing part is in contact with an inner peripheral face of the outer hub and an outer peripheral face of the inner hub, and a clearance is formed between at least a part of the elastic member disposed at the first facing part and at least one of the inner peripheral face of the outer hub and the outer peripheral face of the inner hub.

Thus, when at least a part of the elastic member disposed at the second facing part is in contact with each of the inner peripheral face of the outer hub and the outer peripheral face of the inner hub, the elastic member disposed at the second facing part can function as a biasing member. That is, the function of the elastic member as the biasing member is maintained.

Further, when at least a part of the elastic member disposed at the first facing part is in separated from at least one of the inner peripheral face of the outer hub and the outer peripheral face of the inner hub, the function of the elastic member at the first facing part as the biasing member is lowered.

Accordingly, even when the spring constant of the elastic member at the first facing part in the rotation direction of the shaft is changed, it is possible to reduce the influence on the spring constant in the axial direction of the shaft caused by the change. Thus, it is possible to ensure the responsiveness of coupling between the rotor and the armature and detachment between the rotor and the armature along with on and off of energization of the electromagnet while improving the durability of the elastic member in the rotation direction of the shaft.

According to a seventh aspect, in the power transmission device, a dimension of at least a part of the elastic member in the second facing part in the radial direction of the shaft is equal to or larger than a clearance dimension between the outer hub and the inner hub in the second facing part. A dimension of at least a part of the elastic member in the first facing part in a direction perpendicular to the radial direction of the shaft is smaller than a clearance dimension between the outer hub and the inner hub in the first facing part. Accordingly, the function of the elastic member at the first facing part as the biasing member is lowered by making a part of the elastic member at the second facing part to function as the biasing member.

According to an eighth aspect, in the power transmission device, the inner peripheral side of the outer hub and the outer peripheral side of the inner hub face each other at a facing part. The facing part has: a first facing part where the inner peripheral side of the outer hub and the outer peripheral side of the inner hub face each other in the rotation direction of the shaft; and a second facing part where the inner peripheral side of the outer hub and the outer peripheral side of the inner hub do not face each other in the rotation direction of the shaft. The elastic member is configured in such a manner that at least a part of the elastic member in the second facing part is in contact with an inner peripheral face of the outer hub and an outer peripheral face of the inner hub, and at least a part of the elastic member in the first facing part has a resistance reducer for reducing a frictional resistance produced against at least one of the inner peripheral face of the outer hub and the outer peripheral face of the inner hub.

Thus, when at least a part of the elastic member disposed at the second facing part is in contact with each of the inner peripheral face of the outer hub and the outer peripheral face of the inner hub, the elastic member disposed at the second facing part can function as a biasing member. That is, the function of the elastic member as the biasing member is maintained.

Further, when the resistance reducer for reducing a frictional resistance produced is provided to at least a part of the elastic member disposed at the first facing part, the function of the elastic member at the first facing part as the biasing member is lowered.

Accordingly, even when the spring constant of the elastic member at the first facing part in the rotation direction of the shaft is changed, it is possible to reduce the influence on the spring constant in the axial direction of the shaft caused by the change. Thus, it is possible to ensure the responsiveness of coupling between the rotor and the armature and detachment between the rotor and the armature along with on and off of energization of the electromagnet while improving the durability of the elastic member in the rotation direction of the shaft.

According to a ninth aspect, the resistance reducer includes a part with a surface treatment for reducing the frictional resistance applied. Thus, the function of the elastic member at the first facing part as the biasing member is lowered without providing a clearance between the elastic member and each of the hubs.

According to a tenth aspect, a part of the resistance reducer includes: a projection projecting toward at least one of the inner peripheral side of the outer hub and the outer peripheral side of the inner hub; and a separated part separated from at least one of the inner peripheral side of the outer hub and the outer peripheral side of the inner hub. Thus, the function of the elastic member at the first facing part as the biasing member is lowered by decreasing the contact area between the part of the elastic member disposed at the first facing part and each of the hubs.

According to an eleventh aspect, in the power transmission device, the inner peripheral side of the outer hub and the outer peripheral side of the inner hub face each other at a facing part. The facing part has a first facing part where the inner peripheral side of the outer hub and the outer peripheral side of the inner hub face each other in the rotation direction of the shaft, and a second facing part where the inner peripheral side of the outer hub and the outer peripheral side of the inner hub do not face each other in the rotation direction of the shaft. At least a part of the elastic member in the second facing part is configured to abut on the inner peripheral side of the outer hub and the outer peripheral side of the inner hub. At least a part of the first facing part has a resistance reducer for reducing a frictional resistance produced against the elastic member.

Thus, when at least a part of the elastic member disposed at the second facing part is in contact with each of the inner peripheral face of the outer hub and the outer peripheral face of the inner hub, the elastic member disposed at the second facing part can function as a biasing member. That is, the function of the elastic member as the biasing member is maintained.

Further, when the resistance reducer for reducing a frictional resistance produced is provided to at least a part of the elastic member disposed at the first facing part, the function of the elastic member at the first facing part as the biasing member is lowered.

Accordingly, even when the spring constant of the elastic member at the first facing part in the rotation direction of the shaft is changed, it is possible to reduce the influence on the spring constant in the axial direction of the shaft caused by the change. Thus, it is possible to ensure the responsiveness of coupling between the rotor and the armature and detachment between the rotor and the armature along with on and off of energization of the electromagnet while improving the durability of the elastic member in the rotation direction of the shaft.

According to a twelfth aspect, the resistance reducer includes a part with a surface treatment for reducing the frictional resistance applied on at least one of the inner peripheral side of the outer hub and the outer peripheral side of the inner hub. Thus, the function of the elastic member at the first facing part as the biasing member is lowered without providing a clearance between the elastic member and each of the hubs.

According to a thirteenth aspect, at least one of the inner peripheral side of the outer hub and the outer peripheral side of the inner hub has the resistance reducer including: a projection projecting toward the elastic member in the first facing part; and a separated part separated from the elastic member. Thus, the function of the elastic member at the first facing part as the biasing member is lowered by decreasing the contact area between the part of the elastic member disposed at the first facing part and each of the hubs.

According to a fourteenth aspect, in the power transmission device, at least a part of the elastic member in the second facing part is press-fitted between the inner peripheral side of the outer hub and the outer peripheral side of the inner hub. A part of the inner peripheral side of the outer hub where the elastic member is press-fitted has a tapered shape so that a press-fitting allowance for the elastic member increases from a front side toward a back side in a press-fitting direction of the elastic member.

Therefore, the outer hub and the elastic member can be properly assembled while the elastic member at the second facing part can function as the biasing member. The press-fitting allowance in this case is a diameter difference obtained by subtracting the outer diameter of the elastic member from the inner diameter of the part of the inner peripheral side of the outer hub where the elastic member is press-fitted.

According to a fifteenth aspect, a part of the outer peripheral side of the inner hub where the elastic member is press-fitted has a tapered shape so that the press-fitting allowance for the elastic member increases from the front side toward the back side in the press-fitting direction of the elastic member. Therefore, the inner hub and the elastic member can be properly assembled while the elastic member at the second facing part can function as the biasing member. The press-fitting allowance in this case is a diameter difference obtained by subtracting the outer diameter of the part of the outer peripheral side of the inner hub where the elastic member is press-fitted from the inner diameter of the elastic member.

According to the sixteenth aspect, the elastic member is made of any of EPDM, NBR, and H-NBR which are rubber materials. Since the elastic member has high wear resistance, it is possible to reduce wear of the elastic member caused by friction, in a part not bonded with the inner hub and the outer hub. As a result, it is possible to increase the life of the elastic member.

What is claimed is:

1. A power transmission device that transmits a rotary driving force output from a driving source to a driving target device, the power transmission device comprising:
    an electromagnet that generates an electromagnetic attraction force by energization;
    a rotor that rotates by the rotary driving force;
    an armature that is coupled to the rotor to rotate integrally with the rotor when the electromagnet is energized and detached from the rotor when the electromagnet is not energized; and
    a hub that couples the armature to a shaft of the driving target device, wherein:
    the hub includes an outer hub coupled to the armature, an inner hub coupled to the shaft, and an elastic member interposed between the outer hub and the inner hub;
    an outer peripheral side of the inner hub includes a plurality of extending parts each extending outward in a radial direction of the shaft;
    an inner peripheral side of the outer hub includes an inner peripheral side wall that overlaps with the extending parts in a rotation direction of the shaft and surrounds the extending parts;
    the elastic member is disposed in an unbonded state with respect to at least one of the inner hub and the outer hub between the outer peripheral side of the inner hub and the inner peripheral side of the outer hub;
    the inner peripheral side of the outer hub and the outer peripheral side of the inner hub face each other at a facing part, the facing part having a first facing part where the inner peripheral side of the outer hub and the outer peripheral side of the inner hub face each other in the rotation direction of the shaft, and a second facing part where the inner peripheral side of the outer hub and the outer peripheral side of the inner hub do not face each other in the rotation direction of the shaft;

at least a part of the elastic member disposed at the second facing part is in contact with an inner peripheral face of the outer hub and an outer peripheral face of the inner hub; and a clearance is formed between at least a part of the elastic member disposed at the first facing part and at least one of the inner peripheral face of the outer hub and the outer peripheral face of the inner hub.

2. The power transmission device according to claim 1, wherein:

the outer hub includes an outer side receiving part that faces the elastic member in an axial direction of the shaft to restrict the elastic member from moving in the axial direction of the shaft; and the inner hub includes an inner side receiving part that faces the elastic member in the axial direction of the shaft to restrict the elastic member from moving in the axial direction of the shaft.

3. The power transmission device according to claim 2, wherein:

the outer side receiving part includes a flat part that covers a swelling part swelling in the axial direction of the shaft when a compressive load acts on the elastic member; and the inner side receiving part includes a flat part that covers a swelling part swelling in the axial direction of the shaft when a compressive load acts on the elastic member.

4. The power transmission device according to claim 1, wherein:

a dimension of at least a part of the elastic member in the second facing part in the radial direction of the shaft is equal to or larger than a clearance dimension between the outer hub and the inner hub in the second facing part; and a dimension of at least a part of the elastic member in the first facing part in a direction perpendicular to the radial direction of the shaft is smaller than a clearance dimension between the outer hub and the inner hub in the first facing part.

5. The power transmission device according to claim 1, wherein:

at least a part of the elastic member in the second facing part is press-fitted between the inner peripheral side of the outer hub and the outer peripheral side of the inner hub; and a part of the inner peripheral side of the outer hub where the elastic member is press-fitted has a tapered shape so that a press-fitting allowance for the elastic member increases from a front side toward a back side in a press-fitting direction of the elastic member.

6. The power transmission device according to claim 5, wherein a part of the outer peripheral side of the inner hub where the elastic member is press-fitted has a tapered shape so that the press-fitting allowance for the elastic member increases from the front side toward the back side in the press-fitting direction of the elastic member.

7. The power transmission device according to claim 1, wherein the elastic member is made of any of ethylene propylene diene (EPDM), nitrile rubber (NBR), and hydrogenated nitrile rubber (H-NBR), which are rubber materials.

8. A power transmission device that transmits a rotary driving force output from a driving source to a driving target device, the power transmission device comprising:

an electromagnet that generates an electromagnetic attraction force by energization; a rotor that rotates by the rotary driving force;

an armature that is coupled to the rotor to rotate integrally with the rotor when the electromagnet is energized and detached from the rotor when the electromagnet is not energized; and a hub that couples the armature to a shaft of the driving target device, wherein:

the hub includes an outer hub coupled to the armature, an inner hub coupled to the shaft, and an elastic member interposed between the outer hub and the inner hub;

an outer peripheral side of the inner hub includes a plurality of extending parts each extending outward in a radial direction of the shaft;

an inner peripheral side of the outer hub includes an inner peripheral side wall that overlaps with the extending parts in a rotation direction of the shaft and surrounds the extending parts;

the elastic member is disposed in an unbonded state with respect to at least one of the inner hub and the outer hub between the outer peripheral side of the inner hub and the inner peripheral side of the outer hub;

the inner peripheral side of the outer hub and the outer peripheral side of the inner hub face each other at a facing part, the facing part having a first facing part where the inner peripheral side of the outer hub and the outer peripheral side of the inner hub face each other in the rotation direction of the shaft, and a second facing part where the inner peripheral side of the outer hub and the outer peripheral side of the inner hub do not face each other in the rotation direction of the shaft, at least a part of the elastic member in the second facing part is in contact with an inner peripheral face of the outer hub and an outer peripheral face of the inner hub, and at least a part of the elastic member in the first facing part has a resistance reducer to reduce a frictional resistance produced against at least one of the inner peripheral face of the outer hub and the outer peripheral face of the inner hub.

9. The power transmission device according to claim 8, wherein a part of the resistance reducer has a surface treatment for reducing the frictional resistance applied.

10. The power transmission device according to claim 8, wherein a part of the resistance reducer includes:

a projection projecting toward at least one of the inner peripheral side of the outer hub and the outer peripheral side of the inner hub, and a separated part separated from at least one of the inner peripheral side of the outer hub and the outer peripheral side of the inner hub.

11. A power transmission device that transmits a rotary driving force output from a driving source to a driving target device, the power transmission device comprising:

an electromagnet that generates an electromagnetic attraction force by energization;

a rotor that rotates by the rotary driving force;

an armature that is coupled to the rotor to rotate integrally with the rotor when the electromagnet is energized and detached from the rotor when the electromagnet is not energized; and a hub that couples the armature to a shaft of the driving target device, wherein:

the hub includes an outer hub coupled to the armature, an inner hub coupled to the shaft, and an elastic member interposed between the outer hub and the inner hub;

an outer peripheral side of the inner hub includes a plurality of extending parts each extending outward in a radial direction of the shaft;

an inner peripheral side of the outer hub includes an inner peripheral side wall that overlaps with the extending parts in a rotation direction of the shaft and surrounds the extending parts;

the elastic member is disposed in an unbonded state with respect to at least one of the inner hub and the outer hub between the outer peripheral side of the inner hub and the inner peripheral side of the outer hub;

the inner peripheral side of the outer hub and the outer peripheral side of the inner hub face each other at a facing part, the facing part having a first facing part where the inner peripheral side of the outer hub and the outer peripheral side of the inner hub face each other in the rotation direction of the shaft, and a second facing part where the inner peripheral side of the outer hub and the outer peripheral side of the inner hub do not face each other in the rotation direction of the shaft, at least a part of the elastic member in the second facing part is configured to abut on the inner peripheral side of the outer hub and the outer peripheral side of the inner hub, and at least a part of the first facing part has a resistance reducer to reduce a frictional resistance produced against the elastic member.

12. The power transmission device according to claim 11, wherein a part of the resistance reducer has a surface treatment for reducing the frictional resistance applied on at least one of the inner peripheral side of the outer hub and the outer peripheral side of the inner hub.

13. The power transmission device according to claim 11, wherein at least one of the inner peripheral side of the outer hub and the outer peripheral side of the inner hub has the resistance reducer including a projection projecting toward the elastic member in the first facing part, and a separated part separated from the elastic member.

* * * * *